United States Patent
Utukuri et al.

(10) Patent No.: US 9,453,726 B2
(45) Date of Patent: Sep. 27, 2016

(54) SYSTEMS AND METHODS FOR SENSING AND TRACKING RADIATION BLOCKING OBJECTS ON A SURFACE

(71) Applicant: Baanto International Ltd., Mississauga (CA)

(72) Inventors: Avanindra Utukuri, Mississauga (CA); Jonathan Clarke, Toronto (CA)

(73) Assignee: Baanto International Ltd., Mississauga (CA)

( * ) Notice: Subject to any disclaimer, the term of this patent is extended or adjusted under 35 U.S.C. 154(b) by 0 days.

(21) Appl. No.: 14/011,332

(22) Filed: Aug. 27, 2013

(65) Prior Publication Data

US 2014/0019085 A1    Jan. 16, 2014

Related U.S. Application Data

(63) Continuation of application No. PCT/CA2012/000158, filed on Feb. 28, 2012.

(60) Provisional application No. 61/447,678, filed on Feb. 28, 2011.

(51) Int. Cl.
*G01B 15/00* (2006.01)
*G06F 3/042* (2006.01)

(52) U.S. Cl.
CPC ............. *G01B 15/00* (2013.01); *G06F 3/0421* (2013.01); *G06F 2203/04104* (2013.01)

(58) Field of Classification Search
CPC .... G06F 3/042; G06F 3/0421; G06F 3/0426; G06F 3/0428; G06F 2203/04104; G01B 15/00; G01B 15/04
See application file for complete search history.

(56) References Cited

U.S. PATENT DOCUMENTS

| 5,635,724 A * | 6/1997 | Higgins ................... 250/559.19 |
| 7,932,899 B2 | 4/2011 | Newton | |
| 2009/0135162 A1* | 5/2009 | Van De Wijdeven et al. ............................ 345/175 |

FOREIGN PATENT DOCUMENTS

| CA | 2772830 A1 | 3/2011 |
| CN | 101137956 A | 3/2008 |
| WO | 2006/095320 A2 | 9/2006 |
| WO | 2010/039663 A2 | 4/2010 |

OTHER PUBLICATIONS

International Preliminary Report on Patentability for PCT/CA2012/000158, published Sep. 3, 2013.
ISR for PCT/CA2012/000158, published Jun. 13, 2012.

* cited by examiner

*Primary Examiner* — Toan Le

(57) ABSTRACT

Various system and methods for estimating the position of one or more radiation blocking objects on a surface are disclosed. A plurality of radiation sources and radiation sensors are positioned about the surface. A plurality of sectors corresponding to the position of at least some of the radiation blocking objects relative to each of the radiation sensors is determined based on a radiation intensity signal for each radiation sensor. The position of the radiation blocking objects is estimated by analyzing various combinations of the sectors. In some embodiments, the size of a radiation blocking object may be estimated based on characteristics of a polygon corresponding to a combination of sectors.

19 Claims, 14 Drawing Sheets

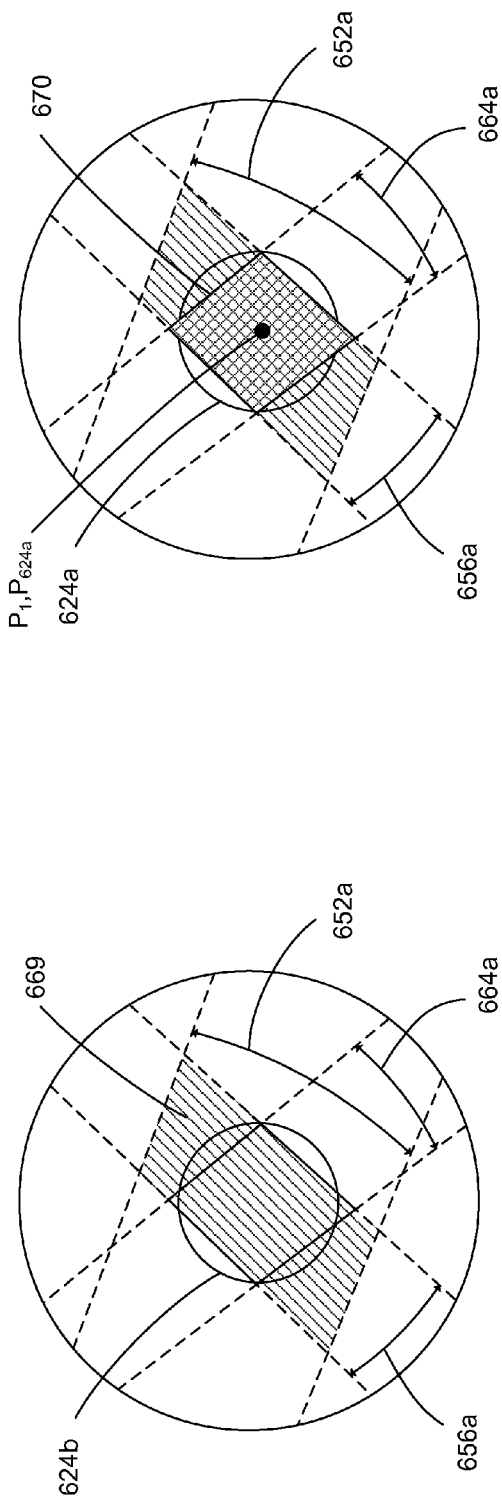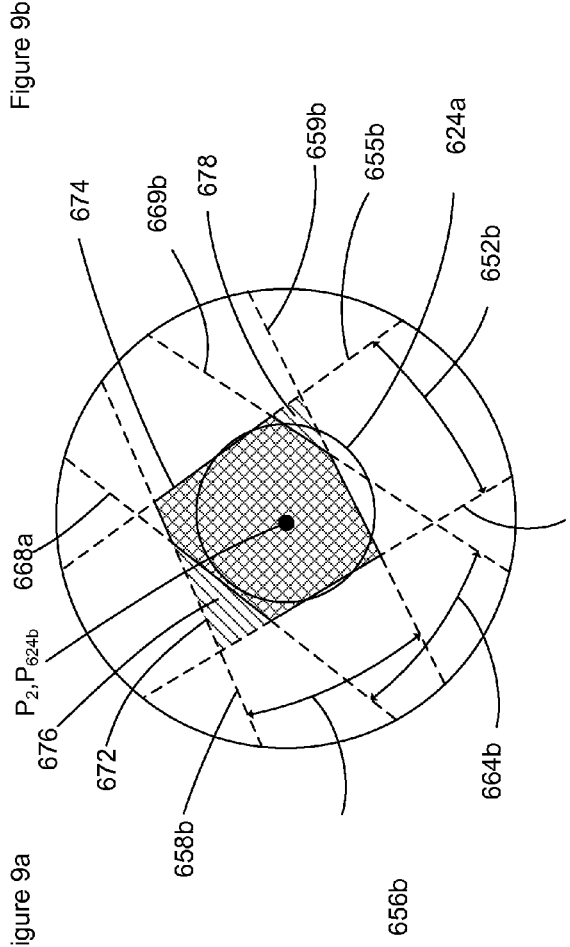
Figure 9a
Figure 9b
Figure 9c

SYSTEMS AND METHODS FOR SENSING AND TRACKING RADIATION BLOCKING OBJECTS ON A SURFACE

FIELD

The described embodiments relate to systems, methods and sensors for sensing and tracking the position of one or more radiation blocking objects on a surface.

BACKGROUND

A variety of computer input and other devices require tracking of one or more objects such as fingers, styluses, pens or other objects as they are positioned on or moved across a surface. For example, computer monitors and other display screens may be fitted with a touchscreen that allows a user to provide inputs to a computer using a finger or a stylus, as they are moved across the display surface of the screen. Similarly, a whiteboard may be fitted with a pen positioning sensing system that tracks the position of one or more pens as they are moved across the writing surface of the whiteboard.

Existing systems suffer from a variety of deficiencies, including excessive complexity and cost, high computational overhead that affects both their accuracy and response time, and other deficiencies.

SUMMARY

The present invention provides various systems for detecting the presence and position of one or more radiation blocking objects as the radiation blocking objects are positioned on or moved across a surface. The surface may be any type of surface such as the display surface of computer monitor or other display device, a writing surface such as a whiteboard, bulletin board, sheet of paper or wall or another surface such as a part of a toy or game.

Various embodiments according to a first aspect of the invention include a frame or housing with a plurality of radiation sources and radiation sensors mounted on it. The frame will typically, but not necessarily, be mounted to or be combined with a housing, frame or support of an underlying system such as a whiteboard, a display monitor, a bulletin board, a game, toy or other device. In some embodiments, the frame or housing may be combined with a display monitor to form a touchscreen. A controller activates some or all of the radiation sources sequentially. The radiation sources may be activated in a sweep fashion from one side of the frame to the other, or they may be activated in a different order. While each radiation source is activated, the radiation incident on some or all of the radiation sensors is measured.

A radiation blocking object present within the frame will typically block or attenuate one or more of the paths between some of the radiation sources and some of the radiation sensors. By successively measuring the attenuation of radiation from such blocking, the position of the radiation blocking object may be estimated.

In embodiments according to another aspect of the invention, one or more diffusers are used to diffuse radiation emitted by the radiation sources. The diffusers may allow the position of a radiation blocking object to be estimated more accurately, particularly when the radiation blocking object blocks two or more of the paths between the radiation sources and a radiation sensor.

In some embodiments, radiation emitted by the radiation sources is modulated at a modulation frequency or with a modulation pattern. The sensors are sensitive to the modulation frequency or pattern and ignore radiation that is not modulated according the frequency or pattern, reducing the effect of ambient and other spurious radiation in estimating the position of a radiation blocking object.

In one aspect, a system for sensing the position of one or more radiation blocking objects on a surface is provided. The surface is mounted to or within a frame, and in some embodiments, the surface and frame are generally rectangular. Radiation sources are provided on the frame and emit radiation across the surface. Radiation sensors are provided at two or more positions on the frame. Each sensor is positioned such that radiation from a plurality of the radiation sources may be incident on each the sensor. Each sensor provides a radiation intensity level corresponding to the intensity of radiation incident on it to a controller. The controller is coupled to the radiation sources and sequentially activates the radiation sources. As each radiation source is activated, radiation from the radiation source may be incident on some or all of the radiation sensors. The controller samples the radiation intensity level from the radiation sensors. The radiation intensity levels are combined into a radiation intensity signal for each radiation source. When a radiation blocking object is present on the surface, the radiation blocking object will typically block or attenuate radiation emitted by one or more of the radiation sources from reaching each of the radiation sensors. Effectively, the radiation sensor is within the shadow of the radiation blocking object when the attenuated radiation sources are activated. The controller identifies a range of adjacent radiation sources for which the radiation intensity level is attenuated compared to a baseline or threshold intensity level, which radiation sources may be referred to as attenuated radiation sources. The range of adjacent attenuated radiation sources may comprise one or more radiation sources.

The controller identifies a sector relative to the position of each radiation sensor and corresponding to the range of attenuated radiation sources as viewed from that radiation sensor. Each sector is a portion of a circle centered at the radiation sensor and extending between the range of attenuated radiation sources. The sectors corresponding to each radiation sensor are analyzed to identify a region of overlap between them, yielding a polygon. The position of the radiation blocking object is estimated to be at a point relative to the polygon. In some embodiments, the radiation blocking object may be estimated to be positioned at the centroid or geometric center of the polygon. In other embodiments, other geometric positions relative to the polygon may be identified.

In some embodiments, the positions of two or more radiation blocking objects may be estimated by identifying sectors corresponding to the position of each radiation blocking object in at least one of the radiation intensity signals. The position of each of the radiation blocking objects is estimated by identifying polygons corresponding to regions of overlap between different combinations of sectors.

In some embodiments, the size of a radiation blocking object is estimated by analyzing the size of the polygon corresponding to the radiation blocking object. For example, the size of a radiation blocking object may be estimated based on the average length of each line between the estimated position of the radiation blocking object and the vertices of the polygon. In other embodiments, the size of the polygon may be estimated based on the area of the polygon.

Some embodiment described herein provide a method of estimating the position of a radiation blocking object on a surface, the method comprising: providing at least three radiation sensors including a first radiation sensor, a second radiation sensor and a third radiation sensor; providing a plurality of radiation sources, wherein: radiation emitted by at least some of the radiation sources passes across the surface and is incident on each of the sensors; assembling a radiation intensity signal corresponding to each of the radiation sensors, including a first radiation intensity signal corresponding to the first radiation sensor, a second radiation intensity signal corresponding to the second radiation sensor and a third radiation intensity signal corresponding to the third radiation sensor; identifying one or more sectors corresponding to each of the radiation sources based on the radiation intensity signals identifying one or more combinations of the sectors; selecting one or more of the combinations; and estimating the position of the radiation blocking object based on the selected combinations.

In some embodiments, selecting one or more combination includes selecting a number of combination corresponding to an estimated number of radiation blocking objects present on the surface.

In some embodiments, selecting one or more combinations includes: identifying a polygon corresponding to one or more of the combinations; and selecting combinations corresponding to polygons having the greatest area.

In some embodiments, selecting one or more combinations includes: identifying a polygon corresponding to one or more of the combinations; and selecting combinations corresponding to polygons having the greatest area.

In some embodiments, selecting one or more combinations includes: identifying a polygon corresponding to one or more of the combinations; and selecting combinations corresponding to polygons that result in a greater angular span of the sectors.

In some embodiments, selecting one or more combinations includes: identifying a polygon corresponding to one or more of the combinations; and selecting combinations corresponding to polygons that result in a maximum angular span of the sectors.

In some embodiments, selecting one or more combinations includes selecting at least combination corresponding to each sector.

In some embodiments, the method further includes recording the estimated position of the one or more radiation blocking objects in a touch table.

In some embodiments, estimating the position of at least one radiation blocking object includes: identifying a polygon corresponding to one of the selected combinations; and estimating the position of the radiation blocking object based on the polygon.

In some embodiments, estimating the position of the radiation blocking object based on the polygon includes identifying a point relative to the polygon.

In some embodiments, the identified point is at the center of a circle inscribed within the polygon.

In some embodiments, the identified point is at the center of a circle that circumscribes the polygon.

In some embodiments, the identified point is the point at which the sum of the shortest distance from the point to the sides of the polygon is minimized.

In some embodiments, the method further includes adjusting at least one of the radiation intensity signals to account for ambient radiation.

In some embodiments, adjusting a radiation intensity signal for ambient radiation includes obtaining an ambient radiation intensity level for the corresponding radiation sensor and adjusting the radiation intensity signal based on the ambient radiation intensity level.

In some embodiments, each radiation intensity signal corresponding to a radiation sensor is assembled by sequentially sampling a radiation intensity level from the radiation sensor while at least some of the radiation sources are sequentially activated.

In some embodiments, the radiation intensity signals are assembled contemporaneously.

In some embodiments, at least one of the radiation sources is activated separately at different intensities to generate a radiation intensity signal corresponding to a first radiation sensor and a radiation intensity signal corresponding to the second radiation sensor.

In some embodiments, the radiation intensity signals are assembled sequentially.

In some embodiments, the edges of a plurality of sectors are determined based on variations of radiation intensity levels in a radiation intensity signal.

In some embodiments, the edges of a plurality of sectors are determined be identifying a range of radiation sources that is attenuated less than the radiation sources on either side of the range by a selected threshold.

Some embodiments disclosed herein provide a method of estimating the size of a radiation blocking object on a surface, the method comprising: providing two or more radiation sensors including a first radiation sensor, a second radiation sensor; providing a plurality of radiation sources, wherein: radiation emitted by at least some of the radiation sources passes across the surface and is incident on each of the sensors; assembling a radiation intensity signal to each of the radiation sensors; identifying one or more sectors corresponding to each of the radiation intensity signals; identifying a polygon corresponding to at least one sector corresponding to each of the radiation intensity signals; and estimating the size of the radiation blocking object based on the polygon.

In some embodiments, the size of the radiation blocking object is estimated based on the geometric characteristics of the polygon.

These and other aspects of the invention are described below in a description of the some example embodiments of the invention.

BRIEF DESCRIPTION OF THE DRAWINGS

Various embodiments of the invention will now be described with reference to the drawings, in which:

FIGS. 9a, 9b and 9c are expanded views of portions of FIG. 6;

The drawings are illustrative only and are not drawn to scale. Various elements of some embodiments may not be shown for clarity. Similar and corresponding elements of the various embodiments are identified by similar reference numerals.

DESCRIPTION OF EXEMPLARY EMBODIMENTS

Figure 1:
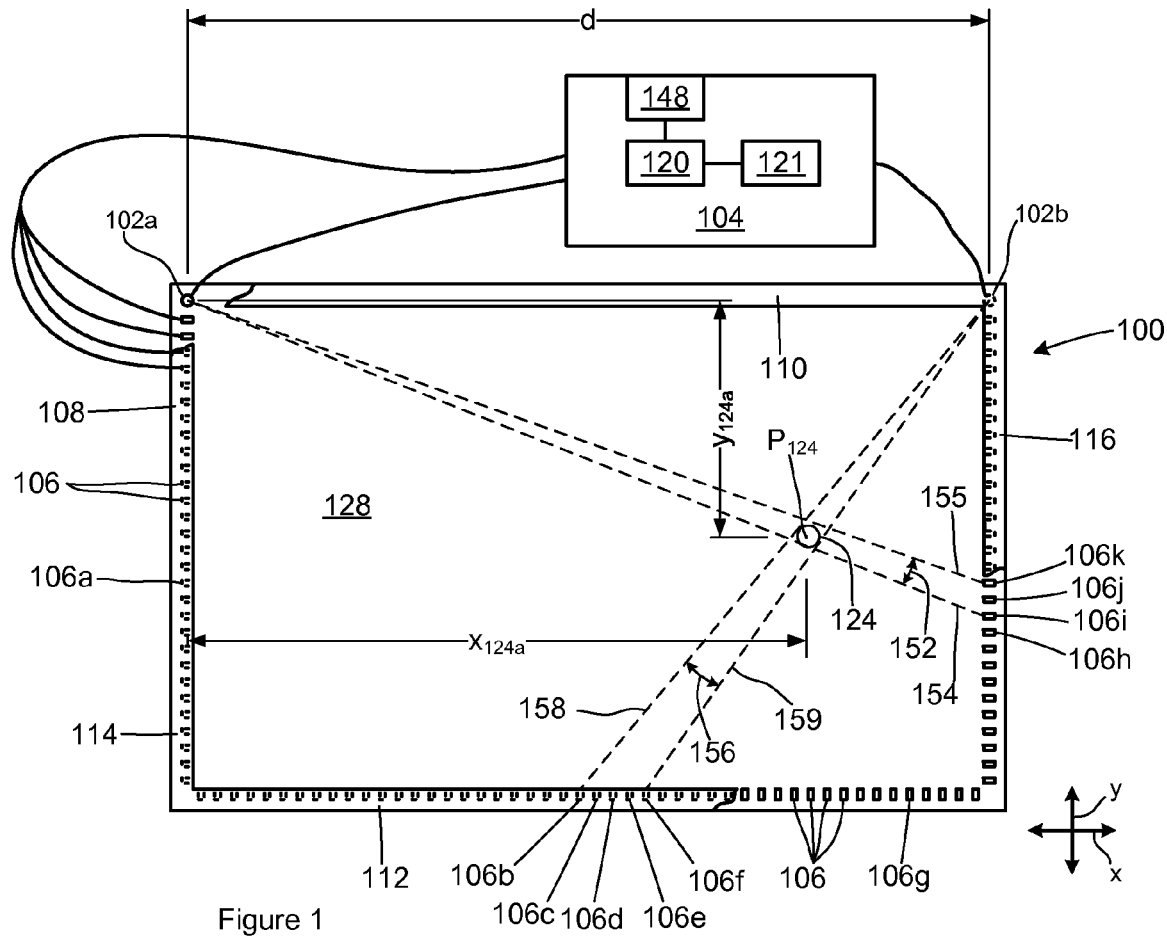
FIG. 1 illustrates a first system according to the present invention.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

The embodiments of the systems and methods described herein may be implemented in hardware or software, or a combination of both. Software components may be implemented in computer programs executing on programmable computers each comprising at least one processor (e.g., a microprocessor), a data storage system (including volatile and non-volatile memory and/or storage elements), at least one input device, and at least one output device. For example and without limitation, the programmable computers (referred to below as computing devices) may be a personal computer, laptop, personal data assistant, cellular telephone, smart-phone device, tablet computer, and/or wireless device. Program code is applied to input data to perform the functions described herein and generate output information. The output information is applied to one or more output devices, in known fashion.

Each program may be implemented in a high level procedural or object oriented programming and/or scripting language to communicate with a computer system. However, the programs may be implemented in assembly or machine language. In any case, the language may be a compiled or interpreted language. Each such computer program is preferably stored on a storage media or a device (e.g. ROM or magnetic diskette) readable by a general or special purpose programmable computer, for configuring and operating the computer when the storage media or device is read by the computer to perform the procedures described herein. The subject system may also be considered to be implemented as a computer-readable storage medium, configured with a computer program, where the storage medium so configured causes a computer to operate in a specific and predefined manner to perform the functions described herein.

Exemplary embodiments described herein provide details relating to systems and methods for determining the position of one or more radiation blocking objects in relation to various radiation sources and radiation sensors. In some embodiment, the radiation sources and sensors may be mounted in a frame. In some embodiments, the systems may include or be used with various underlying devices such as whiteboards, display monitors and other devices. In some embodiments, the systems may include or be used with an underlying surface such as a whiteboard, a wall, the surface of a display screen or any other generally planar surface. The radiation sources may emit radiation in the visible light spectrum or in other spectrums, such as the ultraviolet or infrared spectrums. The embodiments described herein are exemplary only and other implementations and configurations are also possible.

Reference is first made to FIG. 1, which illustrates a system 100 for sensing or estimating the position of a radiation blocking object 124.

System 100 includes a pair of radiation sensors 102a, 102b, a controller 104 and a plurality of radiation sources 106 mounted on a frame or housing 108. Frame 108 has a top side 110, bottom side 112, left side 114 and a right side 116. In this embodiment, radiation sources 106 are mounted on the left, bottom and right sides of frame 108. Radiation sensor 102a is mounted at the top left corner of the frame 108 and radiation sensor 102b is mounted at the top right corner of the frame 108.

Frame 108 surrounds a surface 128. In various embodiments, the surface 128 may be the surface of a display screen, a writing surface or another surface. In this embodiment, frame 108 provides a bezel at the edges of the surface 128. Radiation sources 106 and radiation sensors 102 are mounted within the bezel. In some embodiments, the frame may only partially surround or enclose the surface, for example, the frame may not enclose the top edge of the surface if no radiation sensors or sources are mounted adjacent the top edge. In other embodiments, the frame may support but not enclose the surface. For example, the frame may provide a support for the surface, radiation sensors and radiation sources, but may not have a bezel or other element that surrounds the surface. In other embodiments, the frame may itself provide some or all of the surface. For example, the frame may have solid surface between its edges and radiation blocking objects may be positioned on the solid surface when system 100 is in use. Typically, as in these examples, the surface will be mounted to the frame.

The top left corner of frame 108 is cut away in FIG. 1 to reveal radiation sensor 102a and several radiation sources 106. The bottom right corner of frame 108 is also cut away to reveal some of the radiation sources 106. Each radiation source 106, in this embodiment, is a LED that emits radiation in the infra-red spectrum. In other embodiments, the radiation sources may be various types of sources that emit radiation in other spectrums, including the visible light spectrum and the UV spectrum. Radiation sources 106 are mounted on frame 108 such that radiation from the radiation sources reaches one or both of the radiation sensors 102. In this embodiment, radiation sources are equally spaced along the left, bottom and right sides of frame 108. In this embodiment, frame 108 is rectangular with square corners. The sides of frame 108 are parallel to the axes of an x-y plane. In some embodiments, the radiation sources may not be equally spaced. In some embodiments, the frame may have a non-rectangular shape.

Controller 104 includes a processor 120, which may any type of device or component capable of operating system 100, including a hardware component, a software component or a component including both hardware and software or firmware or both. For example, processor 120 may be a microprocessor, microcontroller, gate array or any type of data processing or computing device. The processor can be programmed or configured to operate system 100 and its components and to communicate with external devices. Controller 104 may also includes a memory 121, which may be accessed by processor 120. Processor 120 controls the operation of controller 104 and system 100. Instructions may be recorded in the memory 121, and may be loaded into the processor to configure the processor to perform control, data processing, data transformation and communication operations for controlling the operation of the controller 104 and the system 100 as described below. Controller 104 is coupled to each radiation source 106. Only some of these connections are illustrated in FIG. 1. Controller 104 is capable of activating each radiation source 106 independently so that when one radiation source is activated or on (i.e. emitting radiation) the remaining radiation sources are not activated or off (i.e. not emitting radiation).

In this embodiment, each radiation sensor 102 is a PIN photodiode that is capable of sensing radiation emitted by the radiation sources 106 on the two opposing sides of frame 108. Radiation sensor 102a senses radiation emitted by the radiation sources 106 on the bottom and right sides of frame 108. Radiation sensor 102b senses radiation emitted by the radiation sources 106 on the bottom and left sides of frame 108. Each radiation sensor 102 is coupled to controller 104 and provides a radiation intensity level to the controller corresponding to the intensity of radiation falling on the radiation sensor 102 at any particular time. The radiation intensity level has a relatively high value when the corresponding radiation sensor 102 is receiving radiation from a radiation source 106 and a relatively low value when the corresponding radiation sensor 102 is not receiving radiation from a radiation source 106. A series of radiation intensity levels corresponding to the radiation sources 106 may be combined into a radiation intensity signal that can be used to estimate the position of the radiation blocking object 124. This is explained below.

In other embodiments each radiation sensor may be any device that is responsive to the radiation emitted by the radiation sources and capable of providing a radiation intensity level corresponding to radiation incident on the sensor. For example, a light sensitive element such as a photosensor, photodiode, photocell, a solar cell or a photovoltaic cell may be used to provide radiation intensity levels. The radiation sensor may provide the output radiation intensity level in any format compatible with the controller 104, including a digital or analog format.

Controller 104 is programmed with the dimensions of frame 108, the position of each radiation source 106 and the positions of each radiation sensor 102. In this example, controller 104 is programmed with the following information:

Sensors 102a and 102b are separated by a distance d. Radiation sensor 102a is at the (0,0) origin position on the x-y plane and radiation sensor 102b is at the (d,0) position on the x-y plane.

For each radiation source on the bottom or right side of the frame 108, the angle between the left side of the frame (or a line parallel to the left side of the frame, depending on the position of the radiation sensor 102a) and the path between radiation sensor 102a and the radiation source, or a value corresponding to the angle.

For each radiation source on the left or bottom side of the frame 108, the angle between the right side of the frame (or a line parallel to the right side of the frame, depending on the position of the radiation sensor 102b) and the path between radiation sensor 102b and the radiation source, or a value corresponding to the angle.

Under the control of controller 104, system 100 is operable to estimate the physical position $P_{124a}(x_{124a}, y_{124a})$ of radiation blocking object 124. In FIG. 1, radiation blocking object 124 is illustrated as a round object. Radiation blocking object 124 may be the tip of a stylus, a finger or other object that blocks or attenuates radiation emitted by radiation sources 106 from reaching a radiation sensor 102. The radiation blocking object is in contact with the surface 128, at point $P_{124}$, which corresponds to the physical position $P_{124a}$ discussed here and the pixel position $P_{124d}$ discussed below.

In operation, controller 104 sequentially activates the radiation sources 106. While a radiation source 106 is activated, controller 104 samples the output from one or both of the radiation sensors 102 to obtain a radiation intensity level corresponding to the intensity of radiation incident on each radiation sensor 102. Typically, the path between the radiation source and each radiation sensor will be blocked, partially blocked (ie. partially attenuated) or clear. In some embodiments, while a radiation source 106 is activated, the controller may only check the radiation intensity level for a radiation sensor 102 if there is a direct path between the radiation source 106 and the radiation sensor 102. For example, there is a direct path between radiation sensor 102a and the radiation sources 106 on the bottom side 112 and the right side 116 of frame 108. Similarly, there is a direct path between radiation sources 106 on the left side 114 and the bottom side 112 of the frame 108 and radiation source 102b. In other embodiments, the controller 104 may check the radiation intensity level at a radiation sensor 102 even when the activated radiation source 106 does not have a direct path to the radiation sensor.

Instructions for performing this process are recorded in memory 121. Processor 120 accesses the instructions in memory 121 an executes the instructions to perform the process described above and those described below. Processor 120 may also record data in memory 121 during the performance of this process.

In other embodiments, the specific placement of the radiation sources and radiation sensors and the shape of the frame (which need not be rectangular and may have another shape) will effect which radiation sources have a direct path to which radiation sensors.

Returning to the present embodiment, when radiation source 106a is activated, controller 104 need not sample radiation sensor 102a to obtain a radiation intensity level because there is no direct path between radiation source 106a and radiation sensor 102a that is not obstructed by other radiation sources 106. Controller 104 does sample the radiation intensity level provided by radiation sensor 102b, which will have a relatively high value indicating that the path between radiation source 106a and radiation sensor 102b is clear, or not blocked.

When radiation source 106c is activated, controller 104 samples both radiation sensors 102a and 102b. The radiation intensity level from radiation sensor 102a is relatively high, indicating that the path between radiation source 106c and radiation sensor 102a is clear. The radiation intensity level from radiation sensor 102b is relatively low, indicating that the path between radiation source 106c and radiation sensor 102b is blocked, in this example, by radiation blocking object 124.

When radiation source 106g is activated, the radiation intensity levels from radiation sensors 102a and 102b respectively indicate that the paths between radiation source 106g and radiation sensors 102a and 102b are clear.

When radiation source 106i is activated, controller 104 samples the radiation intensity level from radiation source 102a which indicates that the path between radiation source 106i and radiation sensor 102a is blocked by radiation blocking object 124.

Figure 2A:
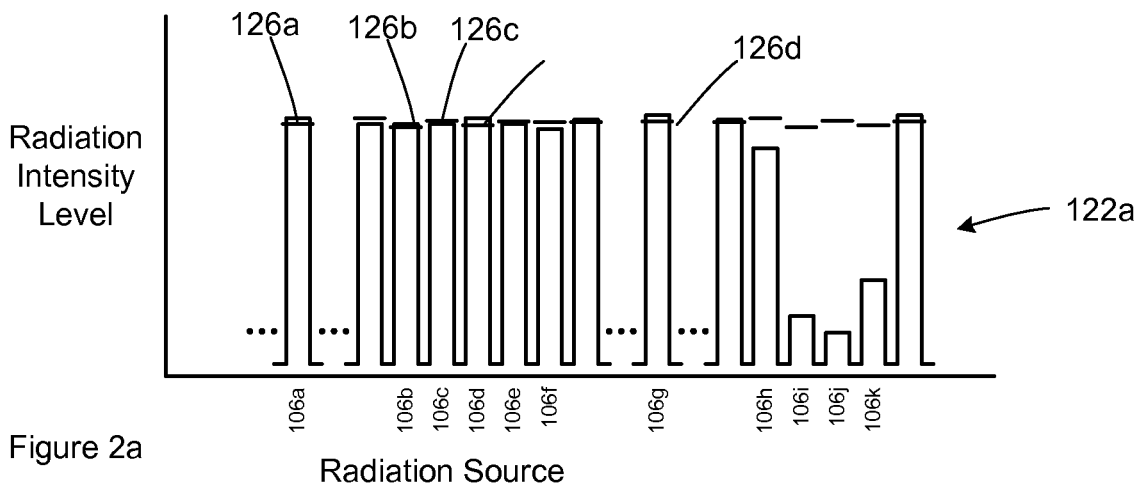
FIGS. 2a and 2b illustrate radiation intensity signals according to the system of FIG. 1.
Figure 2B:
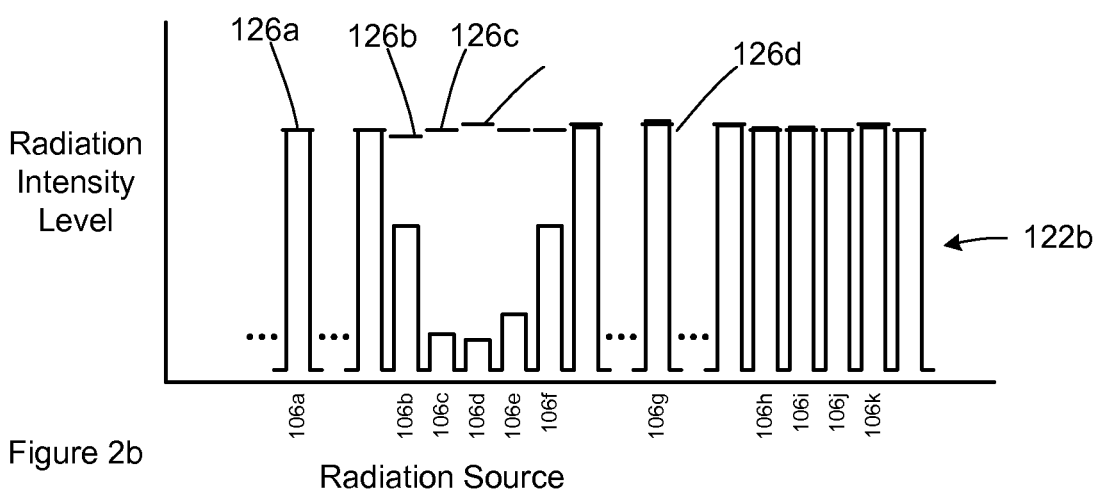

Reference is additionally made to FIGS. 2a and 2b. FIG. 2a illustrates a radiation intensity signal 122a corresponding to the radiation intensity levels obtained by controller 104 from radiation sensor 102a. FIG. 2b illustrates a radiation intensity signal 122b corresponding to the radiation intensity levels obtained by controller 104 from radiation sensor 102b. Each radiation intensity signal comprises the output of radiation sensor 102b as the radiation sources 106 are sequentially activated and then deactivated. While any one radiation source is on, the remaining radiation sources are off.

FIGS. 2a and 2b also respectively illustrate baseline intensity levels 126 for various radiation sources 106 based on radiation intensity levels obtained from radiation sensors 102a and 102b. Controller 104 establishes a baseline intensity level 126 for each radiation source 106 in combination with each radiation sensor 102. For each radiation source, controller 104 samples the radiation intensity level from radiation sensor 102 while the radiation source is on, and in the absence of a radiation blocking object to generate a baseline intensity level 126.

In this embodiment, during startup of system, the baseline intensity level is initially determined for each radiation source, with respect to each radiation sensor from which the radiation source is visible (i.e. if there is a direct path between the radiation source and the radiation sensor). An initial set of radiation intensity level samples of the intensity signal may optionally be discarded while the system is starting up. For a selected time period following this initial start-up period, the radiation intensity level for each radiation source is sampled at each radiation sensor while the radiation source is on. The radiation intensity level is recorded and an average intensity level is determined for the radiation source at each radiation sensor. For example, if each radiation source is activated 50 times per second, the baseline intensity level may be calculated using 25 samples for each radiation source, at each radiation sensor, representing half of a second. In other embodiments, the baseline intensity level may be calculated over more or fewer samples, or for a longer period or shorter period. The baseline intensity level for each radiation sensor inherently takes into account ambient and other conditions affecting the amount of radiation that reaches the radiation sensor when a particular radiation source is switched on. Such other conditions include the amount of radiation emitted by each radiation source, the physical distance between the radiation source and the radiation sensor and may also include the manner in which system 100 is used.

The baseline intensity level calculated for each radiation source 106, with respect to each radiation sensor 102, may be updated over time. For example, a moving average of some of the radiation intensity readings over a recent time period may be calculated to refine the baseline level as ambient and other conditions change. Some radiation intensity readings may not be used to calculate the updated baseline intensity level. For example, every tenth or twentieth radiation intensity reading may be used to calculate the moving average for each baseline intensity level. This reduces the amount of data that must be stored to calculate a baseline intensity level corresponding to a longer time period and also reduces the computation time required in the controller to address this task. Typically, the baseline intensity level will be calculated for a recent period from a part of a second to a few seconds or tens of seconds. When the path between a radiation source 106 and a radiation sensor 102 is blocked the radiation intensity level for that source at that sensor will be significantly reduced, although ambient radiation and some radiation may still reach the radiation sensor around the radiation blocking object. The controller may exclude radiation intensity levels below a certain threshold compared to the current baseline intensity level when refining the baseline intensity as is further described below. Various other methods for calculating a baseline intensity level for each radiation source at each radiation sensor may also be used. In some embodiments, one baseline intensity level may be calculated for a group or all of the radiation sensors. In other embodiments a pre-determined intensity level may be used as the baseline intensity level for some or all of the radiation sources.

In this embodiment, each time a radiation source 106 is activated, the radiation intensity level from each radiation sensor 102 from which the radiation source is visible is sampled and compared to the existing baseline intensity level 126 for that radiation source at that radiation sensor. If the current intensity level is more than some threshold below the baseline intensity level, the percentage difference from the baseline level is calculated. For example, the threshold may be 90% of the baseline intensity level. If the current intensity level is greater than 90% of the baseline level, the current intensity level may be used to further refine the baseline level, or it may be discarded. If it is less than 90% of the baseline level, the processor assumes that the path between the radiation source 106 and the radiation sensor 102 is at least partially blocked. In other embodiments, other threshold levels may be used.

The controller successively activates the radiation sources in a cyclic process. After each cycle of switching on the radiation sources 106 and measuring the radiation intensity level from each radiation sensor for the radiation sources, the controller estimates the position of the radiation blocking object.

Controller 104 is configured or programmed to estimate the position $P_{124a}$ of the radiation blocking object 124 using the radiation intensity signals 122.

Controller 104 identifies one or more ranges of attenuated radiation sources in each of the radiation intensity signals 122 by comparing each radiation intensity level to its corresponding baseline intensity level. In this embodiment, a radiation intensity level is considered to be attenuated if it is less than a percentage threshold of its corresponding baseline intensity level. In this embodiment, the percentage threshold is 80%. In other embodiments, other percentage thresholds may be used. In some embodiments, different percentage thresholds may be used for radiation intensity levels corresponding to particular radiation sources of ranges of radiation sources.

In radiation intensity signal 126a, the radiation intensity level for radiation sources 106h-106k are attenuated relative to their respective baseline intensity levels 126. The radiation intensity level for radiation source 106h is greater than 80% of its baseline intensity level and radiation source 106h is not considered to be a part of a range of attenuated radiation sources. The radiation intensity levels for radiation sources 106i-106k are all less than 80% of their respective baseline intensity levels and these adjacent radiation sources are considered a range of attenuated radiation sources, corresponding to line segments 154a and 154b. Line segment 154a extends to a central point on radiation source 106i. Typically, the central point on radiation source 106i will be at or adjacent to the middle of the radiation emitting face or surface of the radiation source. Similarly, line segment 154b extends from radiation sensor 102a to a central point on radiation source 106k. Line segments 154a and 154b delimit a sector 152 of a circle centered at the position of radiation source 102a.

Similarly, in radiation intensity signal 122b, the radiation intensity levels for radiation sources 106b-106f are less than 80% of their respective baseline intensity levels. Controller 104 identifies radiation sources 106b-106f as a range of attenuated radiation sources in radiation intensity signal 122b corresponding to a sector 156 between line segments 158a and 158b. Line segment 158a extends between radiation sensor 102b and a central point on radiation source 106b. Line segment 158b extends between radiation sensor 102b and a central point on radiation source 106f. Sector 156 is a sector of a circle centered at the position of radiation sensor 102b.

Figure 3:
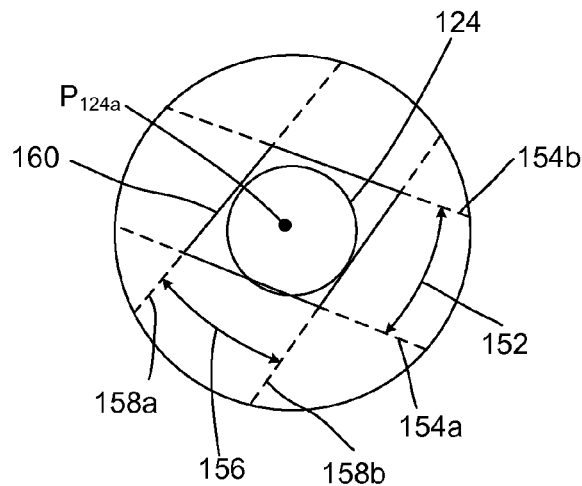
FIG. 3 illustrates an expanded view of a portion of FIG. 1.

Reference is made to FIG. 3, which illustrates the region of radiation blocking object 124 in greater detail. Quadrilateral 160 defines the union or overlap region of sectors 152 and 156. Controller 104 calculates the geometric center, or centroid, of quadrilateral 160 and the resulting point is the estimated position $P_{124a}$ of radiation blocking object 124. In other embodiments, a different point may be calculated as the estimated position $P_{124a}$ of radiation blocking object 124. For example, controller 104 may find the largest circle that can fit within quadrilateral 160 or the smallest circle within which quadrilateral 160 fits. The center of a such a circle may be used as estimated position $P_{124a}$. Other geometric techniques for calculating an estimated position $P_{124a}$ based on sectors 152 and 156 may also be used.

The estimated position $P_{124a}$ corresponds to a point $(x_{124a}, y_{124a})$ on the x-y plane.

The estimated position $P_{124}(x_{124a}, y_{124a})$ is a physical position, measured in the same units as dimension d that separates radiation sensors 102a and 102b, and measured relative to the origin of the x-y plane at the location of radiation sensor 102a.

Controller 104 is coupled to an interface 148, which in this embodiment is a universal serial bus port.

In other embodiments, the interface may be any type of communication interface. For example, interface 148 may be an analog interface or a digital data interface such as a serial data port or a parallel data port. In embodiments where the interface is an analog interface, the controller may provide analog signals (such as a current signal or a voltage signal) corresponding to the value of $x_{124a}$ and $y_{124a}$. In an embodiment where the interface is a digital interface, the controller may be configured to convert the physical positions $x_{124a}$ and $y_{124a}$ into corresponding digital positions $x_{124d}$ and $y_{124d}$ relative to the sensors 102a and 102b. The controller may be configured to provide the digital positions $x_{124d}$ and $y_{124d}$ at the interface.

In the present embodiment, the surface 128 is the surface of a LCD display screen. The LCD display screen has a resolution of X horizontal pixels by Y vertical pixels. For example, in some embodiments, the screen may have a resolution of 1280×1024 pixels or 1920×1080 pixels. In other embodiments a display screen may have any other standard or non-standard pixel resolution. Controller 104 converts the physical position a corresponding pixel position $P_{124d}(x_{124d}, y_{124d})$. Controller 104 may be configured to do so using a variety of techniques, including the use of lookup tables that provide the horizontal and vertical pixel positions corresponding the horizontal and vertical physical positions, using a formula to convert between the physical and pixel positions or using any other method. Controller 104 provides the digital position $P_{124d}$ at the interface 148.

In some embodiments, it may be desirable to measure and take into account a baseline ambient radiation level, as sensed at each radiation source, to account for ambient radiation. For example, in some embodiments, ambient radiation may be sensed by a radiation sensor, with the result that the radiation intensity level provided by a radiation sensor may measure both radiation from a radiation source and from ambient radiation. Controller 104 may be configured to determine the radiation intensity level at each radiation sensor 102 while all of the radiation sources 106 are switched off, thereby establishing an ambient radiation level for each radiation sensor 102. Each ambient radiation level may be an average of a group of samples, it may be a moving average of recently obtained samples or may be calculated in another manner. In some cases, the amount of ambient radiation incident on a radiation sensor may vary over time. It may be desirable to periodically sample ambient radiation at each radiation sensor to update the ambient radiation level. In some embodiments, it may be desirable to obtain an ambient radiation level for each radiation sensor with all of the radiation sources off immediately before (or after) obtaining a radiation intensity level with a radiation source turned on.

The ambient radiation level may be used to scale or adjust the radiation intensity level to remove or reduce the effect of ambient radiation on the estimated positions of a radiation blocking object. For example, the ambient radiation level (or an amount based on the ambient radiation level) may be subtracted from both the baseline intensity level 126 and the measured radiation intensity level for each radiation source before analyzing a radiation intensity signal and estimating the position of radiation blocking object.

In some embodiments, the controller may vary the intensity of radiation emitted by some or all of the radiation sources. This may be done to vary the measured intensity level for a radiation source at the radiation sensors, to overcome the effect of ambient light, to reduce power consumption by the system, or for other reasons.

The intensity of radiation emitted by a radiation source typically decreases as a sensor is spaced further from the radiation source. In FIGS. 2a and 2b, the illustrated radiation intensity levels are illustrative only and have been normalized to ignore the effect of this drop off in radiation intensity. In some embodiments, it may be desirable to compensate for this decline in radiation intensity. For example, in some embodiments, controller 104 may operate each radiation source to emit a higher intensity of radiation based on the distance between the radiation source and the radiation sensor that is sensing the radiation. In such embodiments, it may be preferable to activate some or all of the radiation sources at different intensity levels when sensed by different radiation sources, with the intensity level selected based on the distance from the specific radiation source to each respective radiations sensor.

System 100 may be used in various configurations to identify the position of various types of radiation blocking objects 124. For example, system 100 may be used with a whiteboard or other display surface. Frame 108 may be attached to the edge or frame of the whiteboard, or may also be the frame of the whiteboard. The radiation blocking object 124 may be a pen used to write on the whiteboard and as the pen is moved about the surface of the whiteboard, its position is estimated by controller 104. Controller 104 may be coupled to (or may be part of) a whiteboard system for recording estimates of the pen's position. By recording successive estimates of the pen's position, information on the whiteboard may be recreated in an electronic form and may be recorded for subsequent use, and it may be displayed or printed. The whiteboard system may include software to calculate the path of movement of the pen between estimated positions and to smooth the calculated path.

As the pen is used to write on the whiteboard, the ink on the whiteboard may change the amount of ambient light reflected on to a radiation sensor 102 and could also change the amount of radiation propagating from a radiation source 106 to a radiation sensor 102, thereby affecting the level of the radiation intensity measured for some or all of the radiation sources 106. In such embodiments, periodically updating the baseline intensity level for some or all of the radiation sources may improve the accuracy of estimates of the position of a radiation blocking object.

In other embodiments, system 100 may be used with a display monitor or screen to form a touchscreen. Frame 108 may be mounted to the display monitor or may be part of the display monitor's housing. The radiation blocking object 124 in this case may be a finger, and as a person moves their finger onto or off of the display monitor, the presence of the finger is detected and its position on the display screen is estimated by controller 104. Controller 104 may be coupled to (or may be part of) a touch screen system (which would also include the display monitor) and may provide estimates of the finger's position to the touch screen system. As a finger is moved about on the display screen, successive estimates of the finger's position can be recorded in the touch screen system to provide an electronic record of the finger's movement and the estimated positions can be displayed on the display monitor. The touch screen system may include software or other components to calculate the path of movement of the finger between its successive estimated positions and to smooth the calculated path. Such a touch screen system, in combination with system 100, would effectively allow a user to write or draw on the display monitor, or to manipulate objects displayed on the display monitor, using the person's finger.

In a touch screen system, the radiation sources 106 and radiation sensors 102 may be located relatively close to the display screen and the amount of radiation incident on the radiation sensors may vary as the information displayed on the display screen changes. In such embodiments, it may also be beneficial to update the baseline intensity level for some or all of the radiation sources.

Figure 4A:
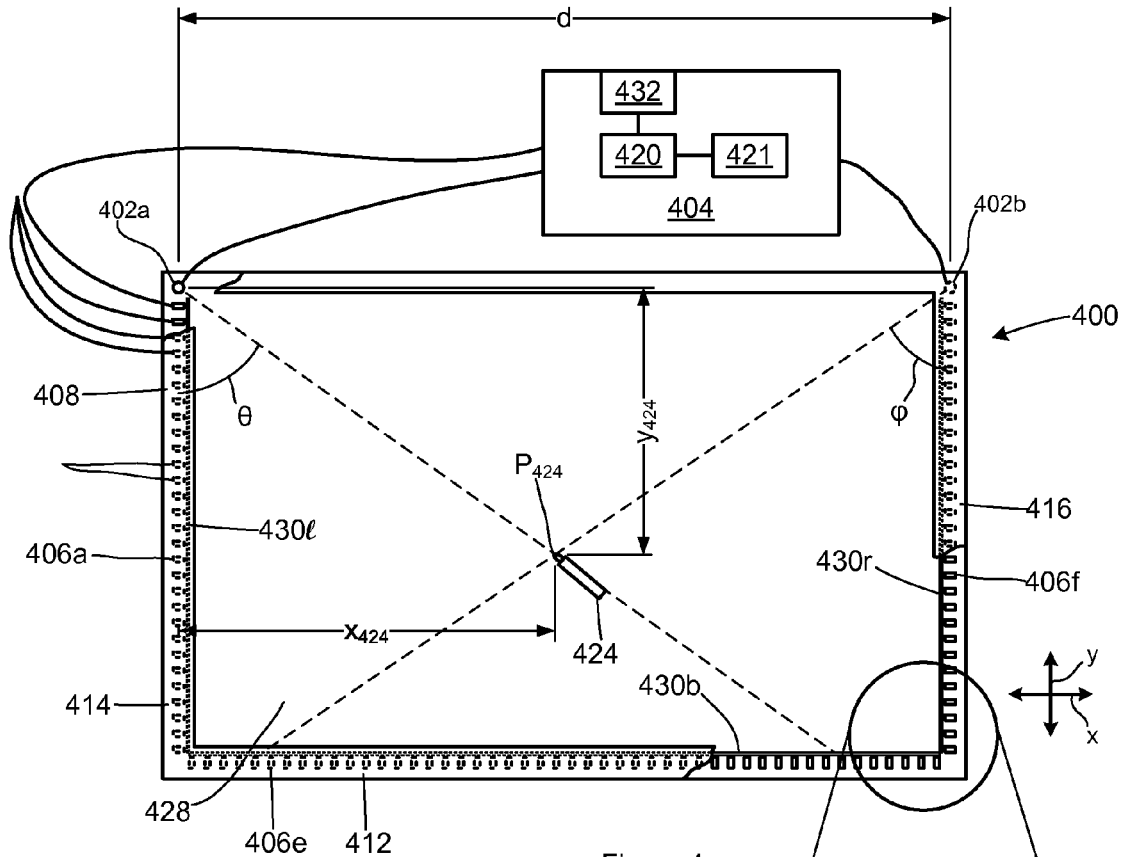
FIGS. 4a and 4b illustrate another embodiment.
Figure 4B:
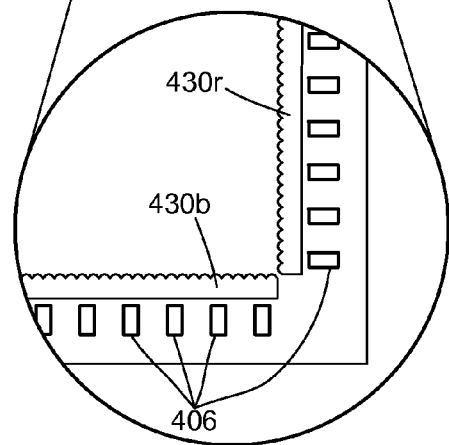

Reference is next made to FIGS. 4a and 4b. FIG. 4a illustrates another system 400 for estimating the position of a radiation blocking object 424. FIG. 4b illustrates the bottom right corner of system 400 in greater detail. System 400 is largely similar to system 100 and corresponding elements are identified with corresponding reference numerals. System 400 includes diffusers 430 mounted adjacent to the radiation sources 406. Diffusers 430 diffuse radiation emitted by the radiation sources, thereby smoothing the amount of radiation apparently emitted along the left, bottom and right sides of the frame 408 by the radiation sources, as viewed from the radiation sensor 402. In this embodiment, the angular position of the radiation blocking object 424 relative to the left and right sides of the frame and the radiation sensors is estimated as described above in relation to system 100. The inventors have found that diffusing the radiation emitted by radiation sources 406 can provide a more accurate estimate of the radiation blocking object's position.

Various materials are suitable for use as diffusers 430, including slightly clouded or translucent plastics or other materials that diffuse but do not excessively scatter radiation from the radiation sources such that it cannot accurately be measured by the radiation sensors 102. In some embodiments, optical grade diffusers which diffuse, but do not substantially block the radiation passing through the diffuser, may be used effectively, including diffraction gratings, lenticular diffusers and lenticular diffraction gratings may be used for the diffusers 430. FIG. 4b illustrates a continuous lenticular diffuser 430b installed on the bottom side 412 of frame 408 and a continuous lenticular diffuser 430r installed on the right side 416 of frame 408.

Figure 5:
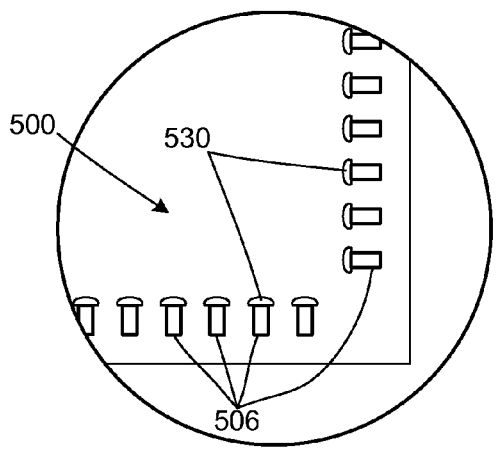
FIG. 5 illustrates another embodiment.

FIG. 5 illustrates a portion of another embodiment 500, corresponding to the portion of system 400 illustrated in FIG. 4b. In system 500, individual diffusers 530 are installed adjacent each radiation source 506.

In the embodiments described above the frame is rectangular and the radiation sensors are mounted in two corners of the frame. In other embodiments, the frame may have a different shape. For example, the present invention may be used with a bulletin board or other object that has any regular or irregular shape and the frame may be shaped and sized to fit on or over the underlying object. Sensors may be positioned at various places on the frame, including along the sides (which may be straight or curved) of the frame. In each case, the position of each sensor and of the radiation sources visible from the sensor are used to geometrically identify the presence and position of a radiation blocking object.

In some embodiments with rectangular or other frame shapes, additional sensors may be used. For example, additional sensors could be added at the bottom left and right corners of system 100 (FIG. 1) and 400 (FIG. 4a). In some embodiments, additional radiation sources could be added along the top side 110 of the frame. In some embodiments, additional information about the position of the radiation blocking object 124 or 424 from the additional sensors may be combined to provide a more accurate estimate of the position of the radiation blocking object.

In some embodiments, with rectangular or other frame shapes, sensors may be placed along the sides of the frame. The positioning of radiation sensor and radiation sources may depend on the portion of an underlying system (such as a whiteboard, display monitor or other system) in which a radiation blocking object is to be detected.

In various embodiments, a system according to the present invention may include a bezel (which may be part of the frame) that conceals some or all of the components of the system including the radiation sources, the radiation sensors and diffusers. In some embodiments, the bezel or the frame or both may be painted with radiation absorbing paint or otherwise adapted to reduce the amount of radiation that is reflected toward the radiation sensors from the bezel or the frame or both.

In some embodiments, an optical filter may be placed between some or all of the radiation sensors and some or all of the radiation sources. For example, an optical filter could be installed around the radiation sensors to reduce the amount of ambient and other undesirable radiation that is incident on the radiation sensors. For example, if the radiation sources emit infrared radiation and the radiation sources are sensitive to infrared radiation, then an optical filter that allow infrared radiation to pass through but attenuates other radiation may be used to reduce the effect of ambient radiation.

Figure 6:
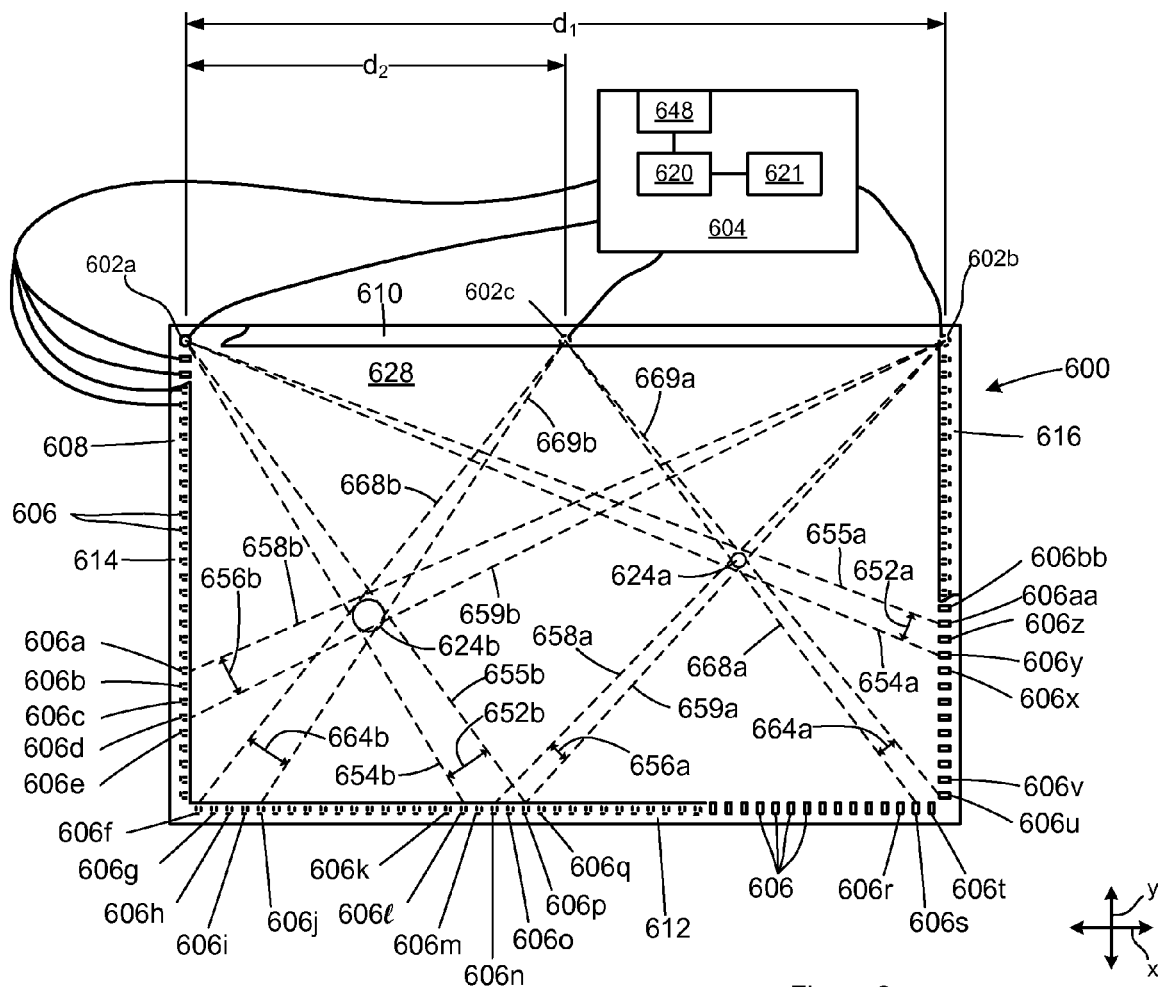
FIG. 6 illustrates yet a further embodiment.

Reference is next made to FIG. 6, which illustrates another system 600 for simultaneously tracking the position of multiple radiation blocking objects 624. System 600 may operate as both an input device and an output device for a connected computer or other external system.

System 600 is similar in construction to systems 100 and 400 and corresponding components are identified by similar reference numerals. As with the systems described above, system 600 may be used as an electronic whiteboard system or a touchscreen system.

System 600 includes three radiation sensors 602a, 602b and 602c, a controller 604, a plurality of radiation sources 606 mounted on a frame 608 and an LCD display screen. Sources 606 are mounted on the left side 614, bottom side 612 and right side 616 of the frame 608. Frame 608 also has a top side 610. Radiation sensor 602a is mounted at the top left corner of frame 608. Radiation sensor 602b is mounted at the top right corner of the frame 608. Radiation sensor 602c is mounted between radiation sensors 602a and 602b on the top side 620 of the frame. Radiation sensors 602a and 602b are separated by a distance $d_1$. Radiation sensors 602a and 602c are separated by a distance $d_2$. Controller 604 is coupled to radiation sensors 602 and radiation sources 606. Controller 604 controls the radiation sources and receives radiation intensity levels from the radiation sensors as described above in relation to system 100.

The sides of frame 608 are parallel to the axes of an x-y plane. Each of the radiation blocking objects 624 is positioned such that the radiation blocking object 624 obstructs the straight line path between at least one of the radiation sources 606 and each of the radiation sensors 602.

The LCD display screen is mounted within frame 608 and has a display surface 628. The line of sight paths along which radiation from the radiation sources 606 to the radiation sensors 602 pass above the display surface, and are generally parallel to the display surface. The LCD display screen has a resolution of X horizontal pixels by Y vertical pixels. For example, in some embodiments the LCD display screen may have a resolution of 1280×1024 pixels or 1920× 1080 pixels. Many other pixel resolutions are possible for various display panels. In various embodiments, any type of display panel may be used in place of an LCD panel. Typically, frame 608 will be mounted to the display panel, or will also form part of the housing of the display panel.

System 600 may optionally include diffusers, such as the diffusers 430 and 530 illustrated in FIGS. 4 and 5.

System 600 will typically include one or more input/output interfaces. In the present embodiment, controller 604 is coupled to a computing device through an interface 648 to transmit the position of radiation blocking objects to the computing device. For example, interface 648 may be a serial interface such as a USB interface or a parallel interface. The LCD display is coupled to the computing device to receive video signals, which are displayed on the display 628, through a video signal interface (not shown).

Figure 7:
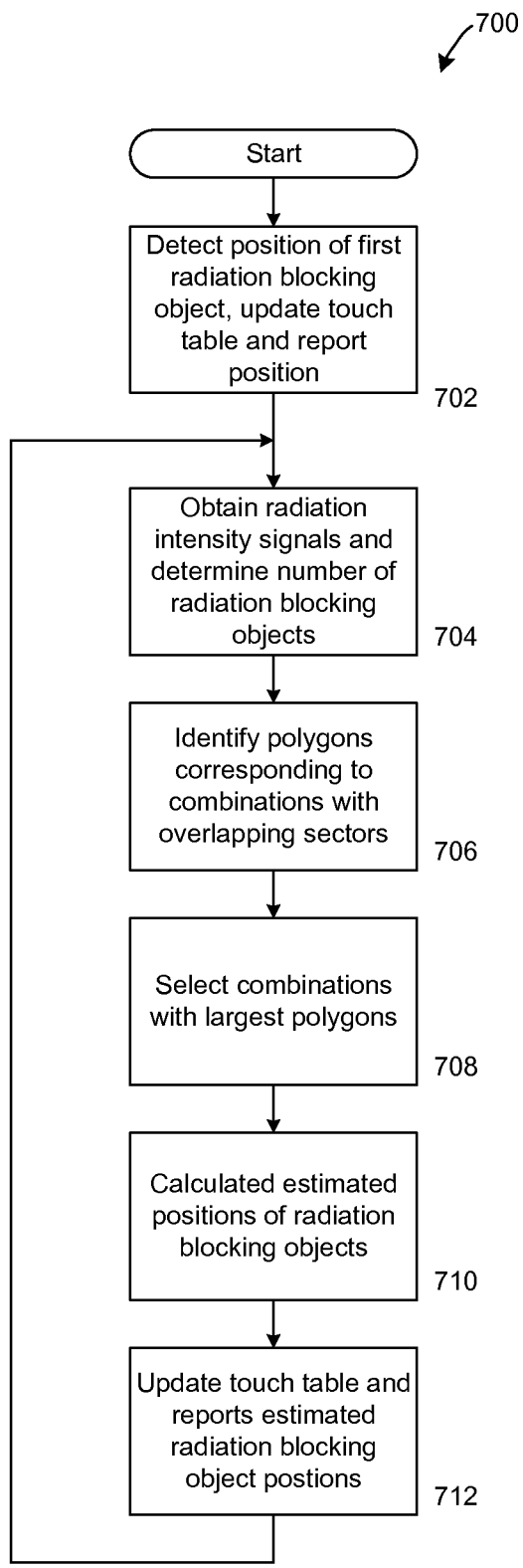
FIG. 7 illustrates a method of identifying or estimating the positions of radiation blocking objects on a surface using the system of FIG. 7.

Reference is next made to FIG. 7, which illustrates a method 700 for identifying or estimating the positions of radiation blocking objects 624a and 624b. In this embodiment, method 700 is performed by controller 604. Instructions for performing method 800 are recorded in memory 721. Controller 604 accesses the stored instructions and executes the instructions to perform the method and is thus configured to perform the method. Prior to the start of method 700, no radiation blocking object is positioned on the display surface 628.

Method 700 begins in step 702, in which a first radiation blocking object 624a is initially positioned on the display surface 628. Method 700 will be explained by way of example. For the purposes of the example, the first radiation blocking object 624a is initially placed on the display surface in the position shown in FIG. 6. In this step, radiation blocking object 624b is not placed on the display surface 628.

Figure 8A:
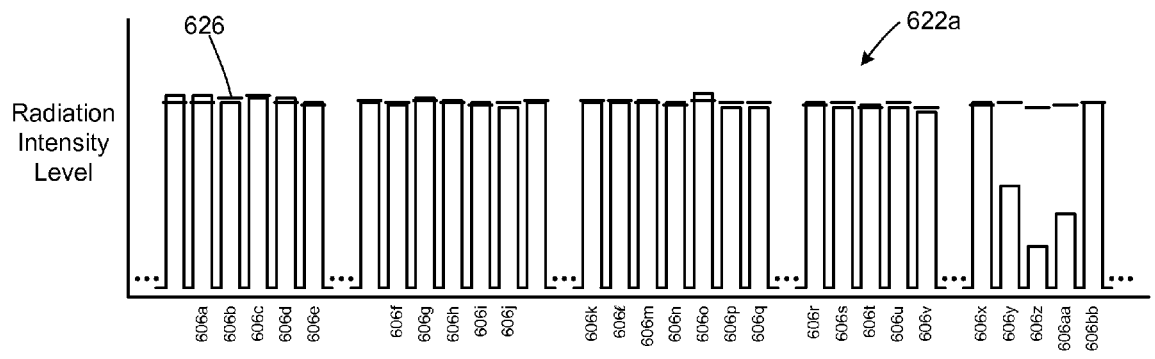
FIGS. 8a, 8b and 8c illustrate radiation intensity signals corresponding to one of the radiation blocking objects of FIG. 6.
Figure 8B:
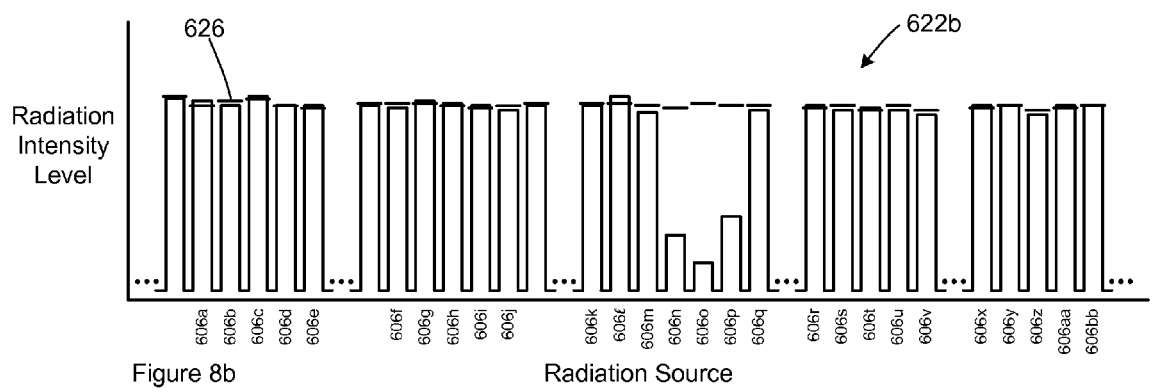
Figure 8C:
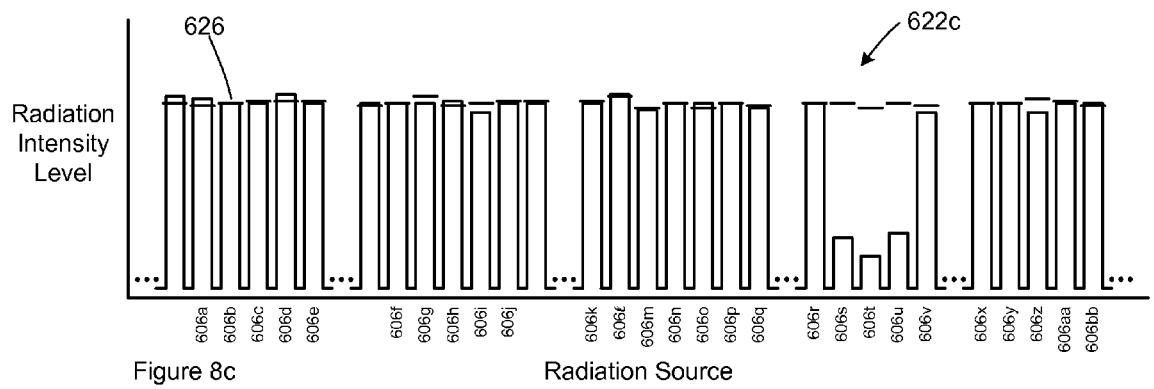

Reference is made to FIGS. 8a, 8b and 8c, which illustrate radiation intensity signals 622a, 622b and 622c after radiation blocking object 624a has been placed on the display surface 628.

Radiation intensity signal 622a illustrates that radiation intensity levels from radiation sources $606y$-$606aa$ are attenuated at radiation sensor 602a, corresponding to sector 652a. Radiation intensity signal 622b illustrates that radiation intensity levels from radiation source $606n$-$606p$ are attenuated at radiation sensor 602b, corresponding to sector 656a. Radiation intensity signal 622c illustrates that radiation intensity levels from radiation source $606s$-$606u$ are attenuated at radiation sensor 602c, corresponding to sector 664a.

Controller 604 uses radiation intensity signals 622a, 622b and 622c as described above in relation to system 100 to estimate the physical position $P_{624a}(x_{aa}, y_{aa})$ of radiation blocking object 724a. Referring to FIG. 9b, controller 604 determines the overlapping region of sectors 652a, 656a and 664a. In this example, the overlapping region is a quadrilateral 670. Position $P_{624a}(x_{aa}, y_{aa})$ is the centroid of quadrilateral 670 and is a physical (or analog) position calculated relative to the x-y plane, which has its origin at the position of radiation sensor 602a.

Controller 604 maintains a touch table, in which the last known position of each radiation blocking object that has been detected on the surface 628 is recorded. Typically, the touch table may be a set of variables or part of a database that is stored in memory 621. In the present embodiment, the touch table includes two slots, A and B, for recording the last known positions of up to two radiation blocking objects. In other embodiments, the touch table may include more than two slots, or may include a variable number of slots.

Controller 604 records the physical position $P_{624a}$ of the first radiation blocking object 624a in slot A in the touch table:

| Slot | X Position | Y Position |
|------|------------|------------|
| A    | $x_{aa}$   | $y_{aa}$   |
| B    | —          | —          |

Physical position $P_{624a}(x_{aa}, y_{aa})$ corresponds to a pixel (or digital) position $P_{624a}(x_{ad}, y_{ad})$ on the LCD display 628. Controller 604 converts the physical position $P_{624a}$ to the corresponding pixel position P$_{624d}$, and provides the pixel position P$_{624d}$ at interface 648.

Method 700 then proceeds to step 704. In step 704, Controller 604 operates radiation sources 606 and sensors 602 to sequentially obtain radiation intensity levels associated with radiation sources 606 from each radiation sensor 602. The radiation intensity levels from each radiation sensor are combined into a radiation intensity signal 622. Controller 604 analyzes each radiation intensity signal 622 to determine the number of radiation blocking objects that are represented in each of the radiation intensity signals.

In this embodiment, up to two radiation blocking objects may be placed on surface 628.

Figure 10A:
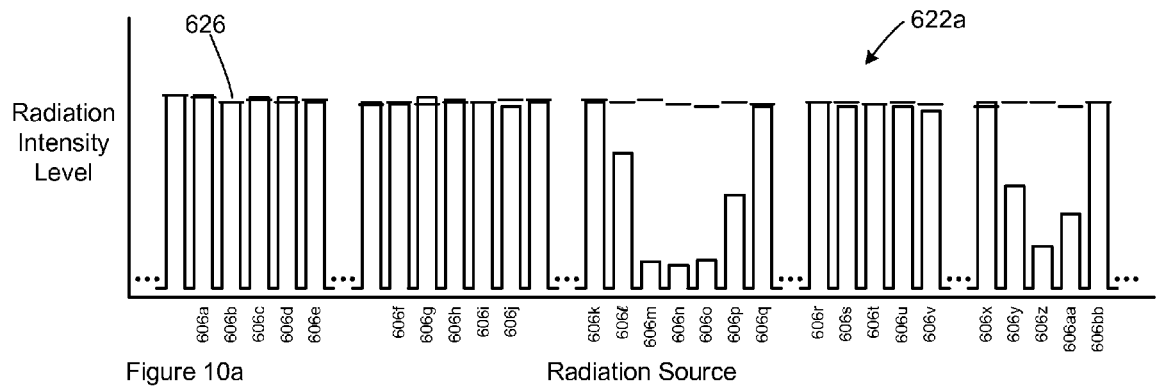
FIGS. 10a, 10b and 10c illustrate radiation intensity signals corresponding to two radiation blocking objects of FIG. 6.
Figure 10B:
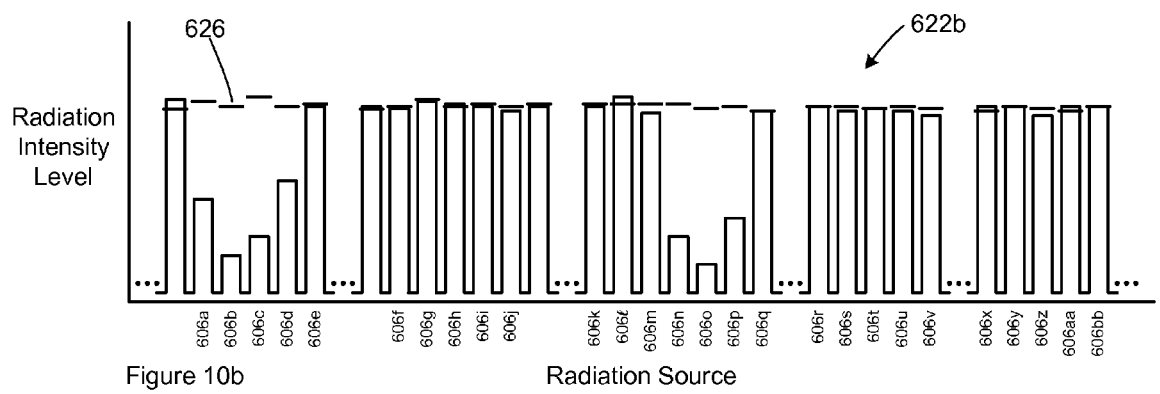
Figure 10C:
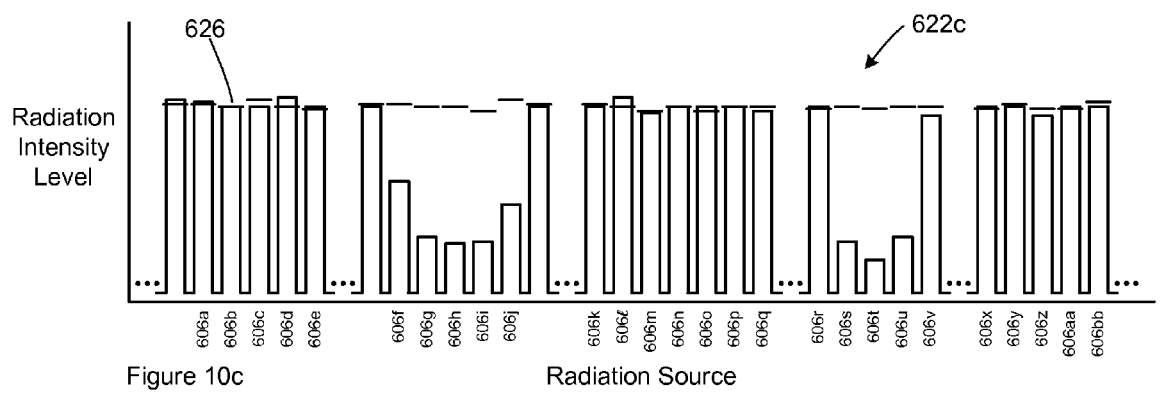

Reference is made to FIGS. 10a, 10b and 10c, which illustrate example radiation intensity signals 622a, 622b and 622c when two radiation blocking objects 624a and 624b are placed on surface 628, as illustrated in FIG. 6. Each of the radiation intensity signals 622a and 622b has two distinct ranges of radiation intensity levels that are attenuated at each of the radiation sensors 602. (A radiation source for which the radiation intensity level is attenuated may be referred to as an attenuated radiation source.) Each range of attenuated radiation intensity levels corresponds to a separate radiation blocking object 624. The ranges of attenuated radiation intensity levels are separated by at least one radiation source that is not attenuated and in this example, each range of attenuated radiation sources corresponds to a distinct sector of a circle centered at the respective radiation sensor 602. For example, and referring also to FIG. 6, in radiation intensity signal 622a, radiation intensity levels for radiation sources 606*l*-606*p* and 606*y*-606*aa* are attenuated at radiation sensor 602a. Radiation source 606*l*-606*p* correspond to sector 652b. Radiation sources 606*y*-606*aa* correspond to sector 652a. Controller 604 is configured to identify the two distinct ranges of attenuated radiation sources by identifying at least one radiation source between the ranges that is not attenuated. In some situations, a range of attenuated radiation sources may consist of a single attenuated radiation source.

In FIG. 10b, radiation intensity signal 622b has two ranges of attenuated radiation sources, 606a-660d and 606n-606p, corresponding respectively to sectors 656b and 656a.

In FIG. 10c, radiation intensity signal 622c has two ranges of attenuated radiation sources, 606a-660d and 606n-606p, corresponding respectively to sectors 664b and 664a.

Controller 604 determines the number of radiation blocking objects present on display surface 628 be determining the maximum number of ranges of attenuated radiation sources in any of the radiation intensity signals 622 Controller 604 is configured to determine the highest number of ranges of attenuated in any one of the radiation intensity signals 622, which is assumed to be the number of radiation blocking objects on the display surface 628. In each of radiation intensity signals 622a, 622b and 622b in FIGS. 10a, 10b and 10c, there are two distinct ranges of attenuated radiation sources. Controller 604 determines that there are two radiation blocking objects on the display surface 628 in the present example.

Figure 11:
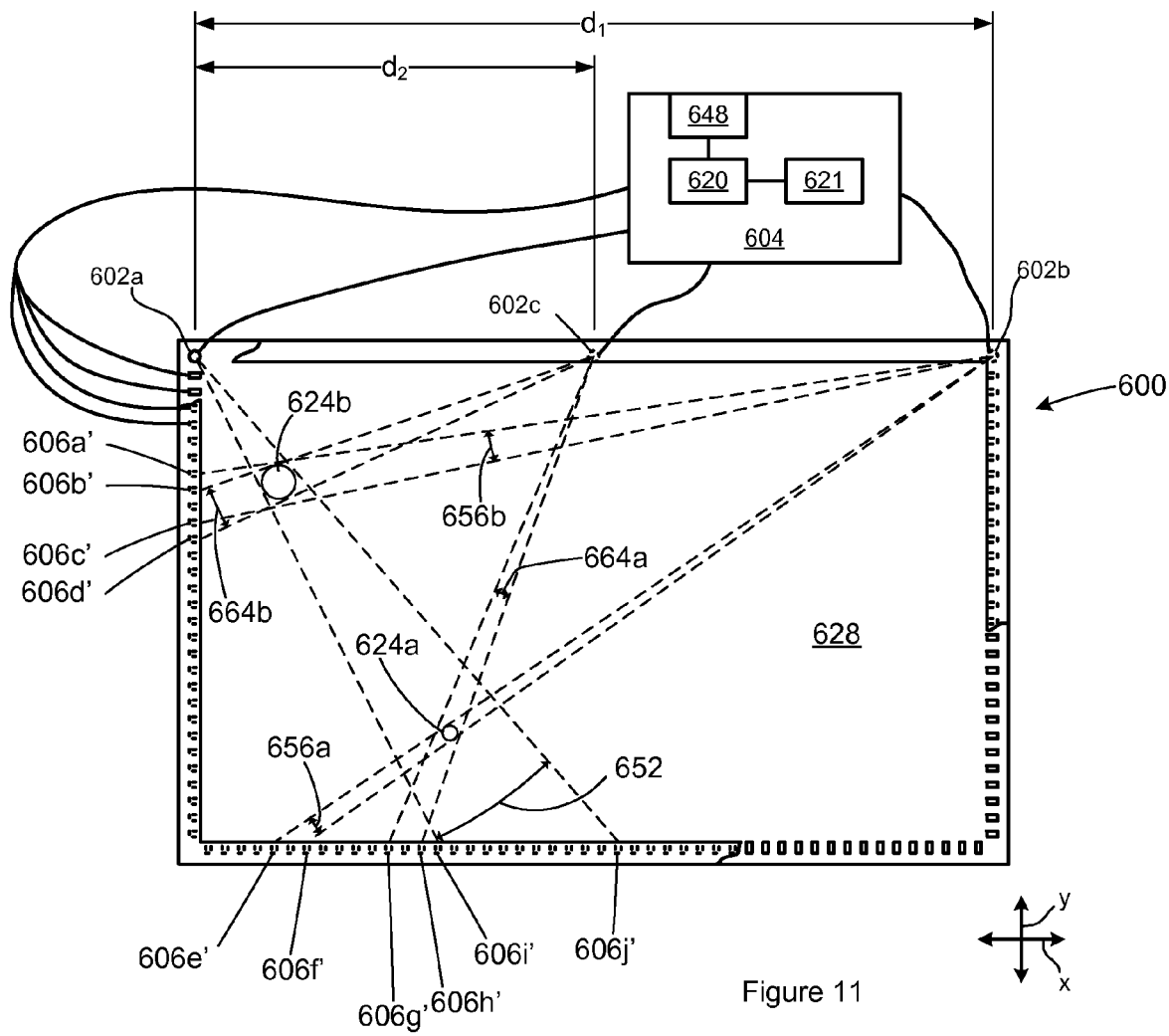
FIG. 11 illustrates the system of FIG. 6 with the radiation blocking objects in a different position.
Figure 12A:
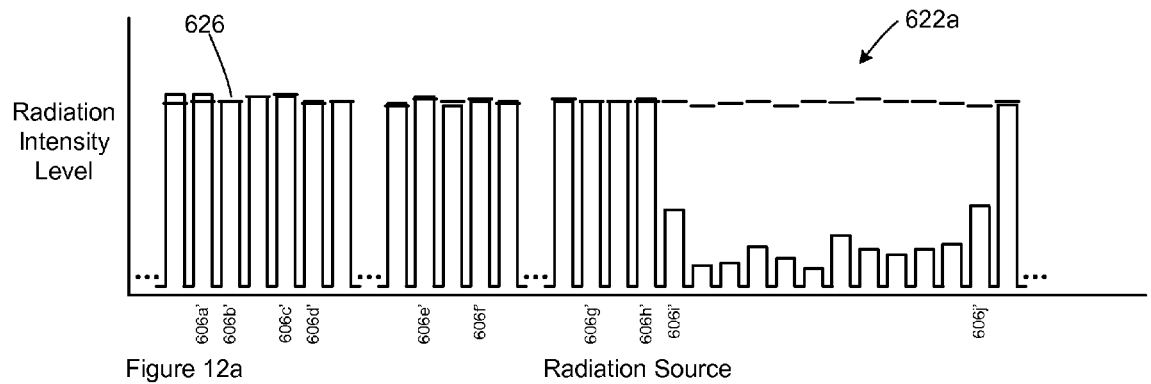
FIGS. 12a, 12b and 12c illustrate radiation intensity signals corresponding to FIG. 11.
Figure 12B:
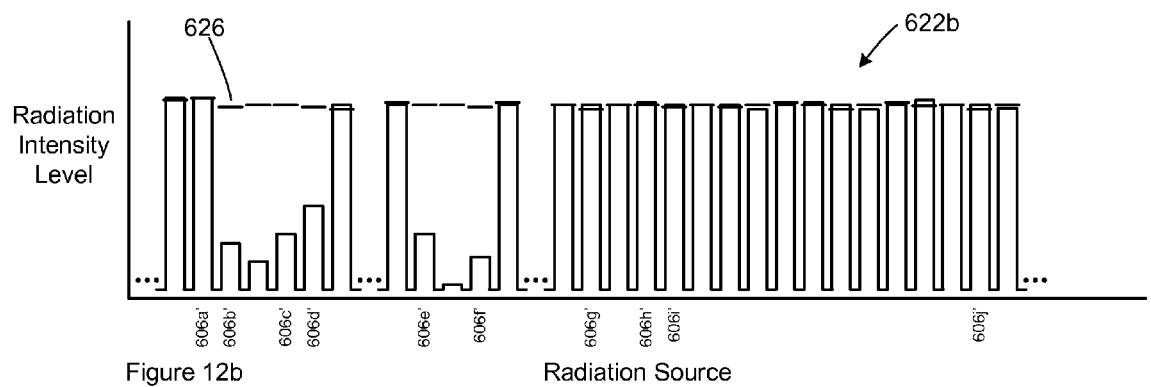
Figure 12C:
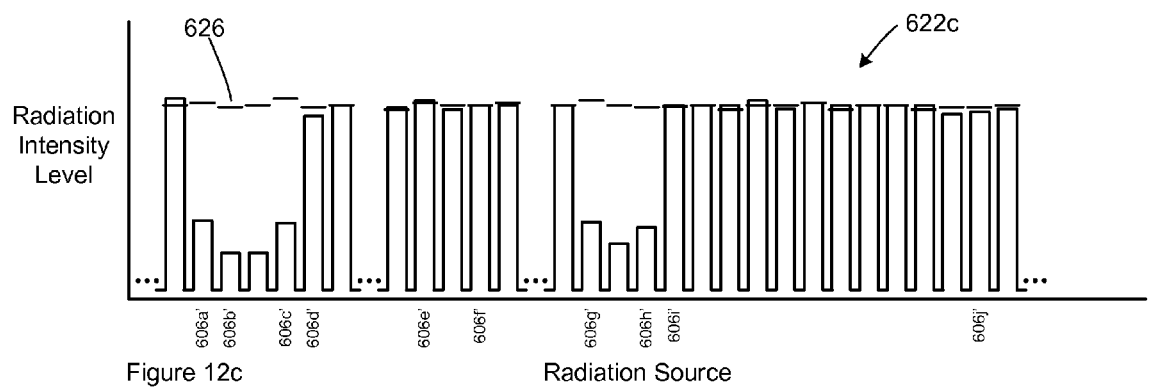

In some cases, the different radiation intensity signals may have a different number of ranges of attenuated radiation sources. Reference is next made to FIG. 11, which illustrates radiation blocking objects 624a and 624b in different positions than in FIG. 6. FIGS. 12a, 12b and 12c illustrate radiation intensity signals 622a, 622b and 622c corresponding to the arrangement shown in FIG. 11.

Radiation blocking object 624b attenuates radiation from radiation sources 606*i'* to 606*j'* when viewed from radiation source 602a, corresponding to sector 652. Radiation blocking object 624a is within sector 652. As a result, radiation intensity signal 622a has only one range of attenuated radiation sources. When viewed from radiation sources 102b and 102c, radiation blocking objects 624a and 624 attenuate radiation from distinct ranges of radiation sources. As a result, each of radiation intensity signals 622b and 622c have two distinct ranges of attenuated radiation intensity levels. Controller 604 thus determines that in the condition illustrated in FIG. 11, two radiation blocking objects are present on display surface 628.

Method 700 then proceeds to step 706, in which controller 604 identifies a set of polygons corresponding to intersection of sectors identified in step 704 and the area of each such polygon.

Referring again to FIG. 6, two sectors are illustrated in relation to each radiation sensor 602. Each sector corresponds to a range of attenuated radiation intensity levels in the respective radiation intensity signal 622 for each radiation source 602. Selecting one sector corresponding to each radiation sensor 602, gives the following combinations of sectors:

| Combination | Radiation sensor 602a | Radiation sensor 602b | Radiation sensor 602c |
|---|---|---|---|
| A | Sector 652a | Sector 656a | Sector 664a |
| B | Sector 652a | Sector 656a | Sector 664b |
| C | Sector 652a | Sector 656b | Sector 664a |
| D | Sector 652a | Sector 656b | Sector 664b |
| E | Sector 652b | Sector 656a | Sector 664a |
| F | Sector 652b | Sector 656a | Sector 664b |
| G | Sector 652b | Sector 656b | Sector 664a |
| H | Sector 652b | Sector 656b | Sector 664b |

Controller 604 determines whether there is a polygon corresponding to the union (or overlap) of the three sectors in each combination, and the area of any such polygon.

Reference is next made to FIGS. 9a to 9c. Controller 604 may determine whether the sectors in each combination overlap at a polygon in any manner.

FIGS. 9a and 9b illustrate one method in relation to combination A. Controller 604 first determines whether there is a region of overlap between two sectors in the combination. In this embodiment, controller first determines whether there is a region of overlap between the sectors corresponding to radiation sensors 602a and 602b. In FIG. 9a, a sectors 652a and 656a overlap at a hatched quadrilateral 669.

If the first two sectors do not overlap (or do not overlap in the area of the display surface 628), then controller 604 records that there is no overlapping region for the combination. If the first two sector do overlap at a polygon, then controller 604 determines whether the polygon overlaps with the other sector in the combination. In FIG. 9b, quadrilateral 669 overlaps with sector 664a at a smaller quadrilateral 670.

In another embodiment having more than three radiation sensors, each combination will have a corresponding greater number of sectors. In such embodiments, the controller sequentially compares each successive quadrilateral with each additional sector. If at any step, there is no overlap between the current quadrilateral and the next sector in the combination, then controller records that there is no region of overlap for the combination.

If there is a region of overlap for all sectors in a combination, then controller 604 determines the area of the region of overlap.

In FIG. 9b, all sectors in combination A have been analyzed to identify quadrilateral 670. Controller 604 calculates and records the area of this quadrilateral.

For combination B, controller 604 the first step in determining whether there is a region of overlap for the three sectors 652a, 656a and 664b would be to identify quadrilateral 669. The next step would determine that there is no region of overlap between the three sectors in that combination. Controller 604 records that there is no region of overlap, or correspondingly, that the area of any region of overlap is zero.

FIG. 9c illustrates the application of this process to combination E. Sectors 652b and 656b overlap in a quadrilateral 672, which corresponds to the entire shaded region (hatched and crosshatched). Sector 664b overlaps with quadrilateral 672 at a hexagon 674, which is crosshatched, eliminating the hatched triangles from the region of overlap. Controller 604 calculates and records the area of overlap.

In the example of FIG. 6, the controller may determine the following results in step 706:

| Combination | Area of union of sectors |
| --- | --- |
| A | 874 |
| B | 0 |
| C | 0 |
| D | 0 |
| E | 442 |
| F | 0 |
| G | 0 |
| H | 0 |

Method 700 then proceeds to step 708.

Controller 604 selects a number of combinations corresponding on the number of radiation blocking objects 624 identified in step 704. In this embodiment, controller 604 selects the combinations for which the largest areas were calculated in step 706.

In the example of FIG. 6, controller 604 determined that there are two radiation blocking objects 624 in step 704 and selects combinations A and E, which are the only two combinations that produce a polygon. The remaining combinations do not have any region of overlap between all three corresponding sectors.

Figure 13:
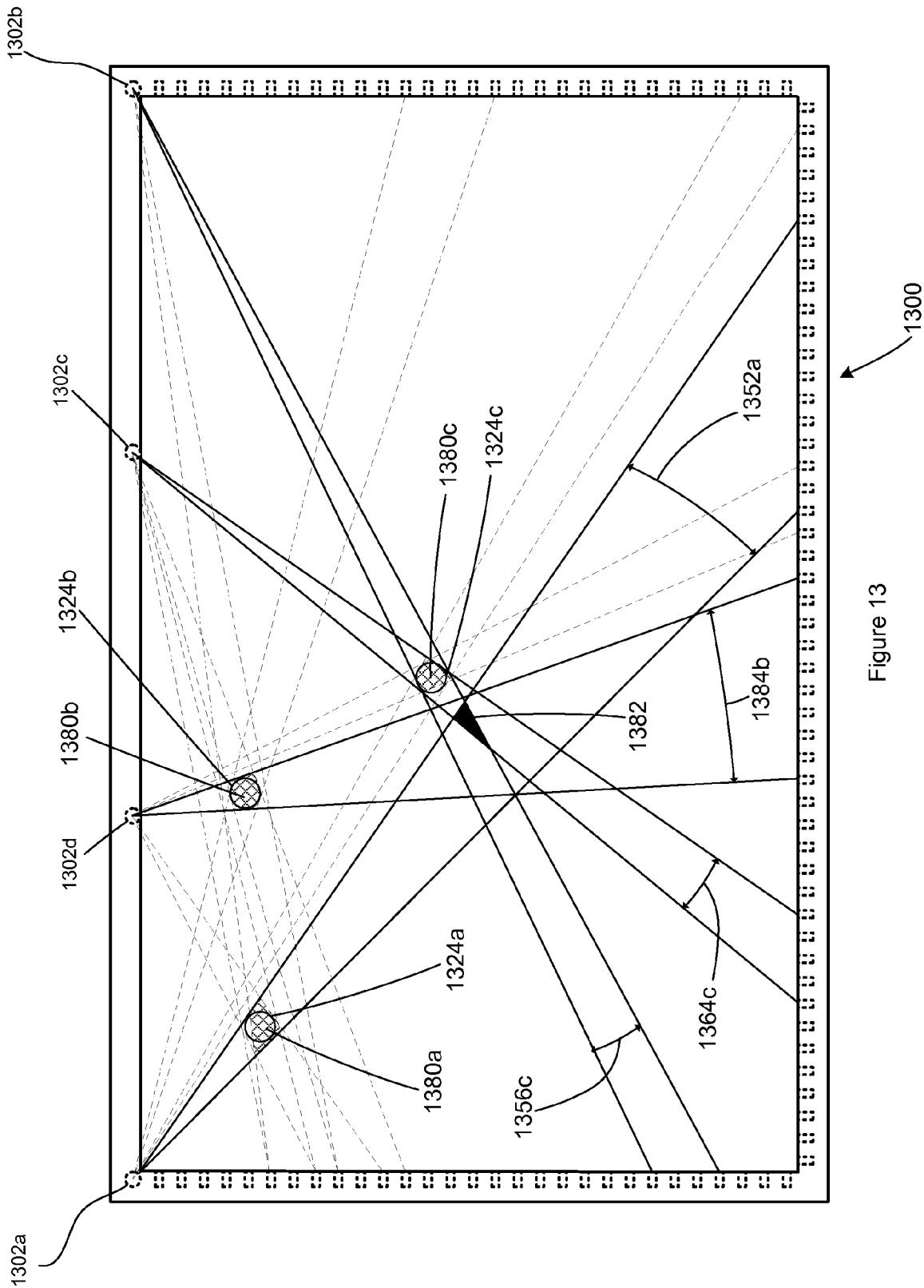
FIG. 13 illustrates another embodiment.

In various situations, more combinations may form a polygon than the number of radiation blocking objects identified in step 704. Reference is made to FIG. 13, which illustrates an example of this. FIG. 13 illustrates a system 1300 that is similar to systems 100 and 600 and corresponding components are identified by similar reference numerals. System 1300 includes four radiation sensors 1302a-1302d. Three radiation blocking objects 1324a-1324c are position on display surface 1328. Various sectors of circles centered at each radiation sensor and corresponding to the position of each radiation blocking object as illustrated in dashed outline. Various combinations of sectors overlap at polygons 1380a, 1380b and 1380b corresponding to the positions of each of the radiation blocking objects. Four of the sectors 1352a, 1356c, 1364c and 1384b are illustrated in solid outline. These four sectors overlap at a triangle 1382. Triangle 1382 does not correspond to a radiation blocking object.

When method 700 is applied to system 1300 as it is illustrated, in step 704, controller would identify that radiation intensity signals (not shown) corresponding to each of radiation sensors 1302a, 1302c and 1302d each exhibit three distinct ranges of attenuated radiation sources corresponding to three distinct sectors. A radiation intensity signal corresponding to radiation sensor 1302b would have only two distinct ranges of radiation sources because radiation blocking object 1324b is partially in the shadow of radiation blocking object 1324a when viewed from radiation sensor 1302b. Controller 1304 would determine that there are three radiation blocking objects on the display surface 1328. In step 706, polygons 1380a, 1380b, 1380c and 1382 will all be identified when the corresponding combinations of sectors are analyzed. The areas of each polygon will also be calculated and recorded. In this step 708, controller 1304 would select the three combinations that have the largest areas. The inventors have found that the combinations with the largest areas of overlap between their respective sectors typically correspond to the actual position of the radiation blocking objects present on the display surface 1328.

In other embodiments, controller may be configured to select among combinations that produce a polygon in a different manner. For example, the controller may be configured to select the combinations that are closest the previously estimated positions of radiation blocking objects. For example, if estimated positions for two radiation blocking objects are recorded in the touch table, then the two combinations whose polygons are closest to the previously recorded positions may be selected in step 708. In some embodiments, a combination of the area or other dimension of the polygons and their distances from previously recorded positions may be used to select combinations. Various other methods are discussed below.

Method 700 then proceeds to step 710, in which the controller 604 calculates an estimated positions for a radiation blocking object corresponding to each combination selected in step 708. In this embodiment, controller 604 calculates the centroid of the polygon corresponding to each selected combination, in the manner described above in relation to system 100. Referring to FIGS. 9b and 9c, in the present example, controller 604 calculates positions $P_1(x_1, y_1)$ and $P_2(x_2, y_2)$, although at this point, it has not been determined which positions corresponds to which radiation blocking object 624a or 624b.

Method 700 then proceeds to step 712, in which the estimated positions calculated in step 710 are recorded in the touch table.

If in step 704, controller 604 determined that only one radiation blocking object is present on the display surface 628, then only one estimated position $P_1$ will have been calculated in step 710. If only one estimated position corresponding to a single radiation blocking object was previously recorded in the touch table, then controller 604 assumes that the same radiation blocking object has moved to the newly estimated position P1 and updates the previously recorded position in the touch table. Controller 604 also converts the estimated physical position $P_1$ of the radiation blocking object into a corresponding pixel position, which is then provided at the interface 648 as the new position of the previously identified radiation blocking object.

If in step 710, controller 604 calculated only one estimated position $P_1$ for one radiation blocking object, but two positions are recorded in the touch table, then controller 604 determines which of the previously recorded positions is closest to the newly calculated estimated position $P_1$. The touch table slot for the closest previously recorded position is updated with the newly calculated coordinates. The other touch table slot is cleared. Controller 604 converts the estimated physical position $P_1$ into a corresponding pixel position and reports it at interface 648 as the new position of the closest previously recorded radiation blocking object. No new position is provided for the other previously recorded radiation blocking object, although, optionally, data identifying the absence of the other radiation blocking object may be provided at the interface.

If in step 704, it was determined that there are two radiation blocking objects present on the display surface, then two estimated positions P1 and P2 will have been calculated in step 710. If there is only one previously recorded position in the touch table, then controller 604 determines which estimated position P1 or P2 is closest to the previously recorded position. The closest estimated position P1 or P2 is used to replace the coordinates of the previously recorded position. The other estimated position in recorded in the other slot in the touch table.

In the present example, slot A in the touch table was previously used to record the initial position of radiation blocking object 624a. In step 710, two positions P1 and P2 corresponding to two radiation blocking objects were calculated. P1 is closer to the original position of radiation blocking object 624a and the coordinates of estimated position P1 are recorded in touch table slot A. The coordinates of estimated position P2 are recorded in slot B. The touch table has the following contents:

| Slot | X Position | Y Position |
|---|---|---|
| A | $x_1$ | $Y_1$ |
| B | $x_2$ | $y_2$ |

Controller 604 converts the estimated physical positions $P_1$ and $P_2$ into a corresponding pixel positions and reports them at interface 648 as the positions of two radiation blocking objects. Position P1 is reported as the new position of previously identified radiation blocking object 624a. Position P2 is reported as the position of a newly identified radiation blocking object 624b.

If in step 710 two estimated positions P1 and P2 are calculated, and two positions are previously recorded in the touch table, then controller 604 determines which newly estimated position is closest to which previously recorded position. Each newly estimated position is deemed to correspond to the previously recorded position closed to the newly estimated position. In the event that both of the newly estimated positions are closer to the same previously recorded position then, controller 604 determines which combination of movement between the two previously recorded positions and the two newly estimated positions would require the smallest total distance of movement. In this manner, one newly estimated position P1 or P2 is deemed to correspond to one of the previously recorded positions and the other newly estimated position is deemed to correspond to the other previously recorded position.

The newly recorded positions are converted into pixel positions and reported as the new positions of each previously identified radiation blocking object at interface 648.

Method 700 then returns to step 704.

Method 700 allows the positions of one or more radiation blocking object to be estimated and tracked. A device coupled to interface 748 will receive successive estimated positions for each radiation blocking object present on the surface and can thus track the radiation blocking object's movement.

In the example embodiments illustrated above, the number of radiation blocking objects shown is less than the number of radiation sources shown. The inventors have found that in various embodiments, a larger number of radiation blocking objects may be tracked than the number of radiation sensors provided. In each embodiment, the touch table will contain sufficient slots to record the estimated positions of the number of radiation blocking objects that may be placed on the surface.

In method 700, system 600 tracks the position of several radiation blocking objects in a touch table and provides the position of the radiation blocking objects at interface 648. In other embodiments, the system may not have a touch table and may not track particular radiation blocking objects. In such embodiments, the system controller may be configured to estimate the position of one or more radiation blocking objects in the manner described above in relation to steps 704-710, or another suitable method, and may simply report the estimated positions of the radiation block objects at the interface 648. The system may do so iteratively and may thus provide a series of estimated positions of radiation blocking objects to an external device during each iteration.

In method 700, one or more combination of sectors are selected in steps 706-708 based on the area of the polygons corresponding to the combinations. In other embodiments, other techniques may be used to select a one or more combination of sectors.

Figure 18:
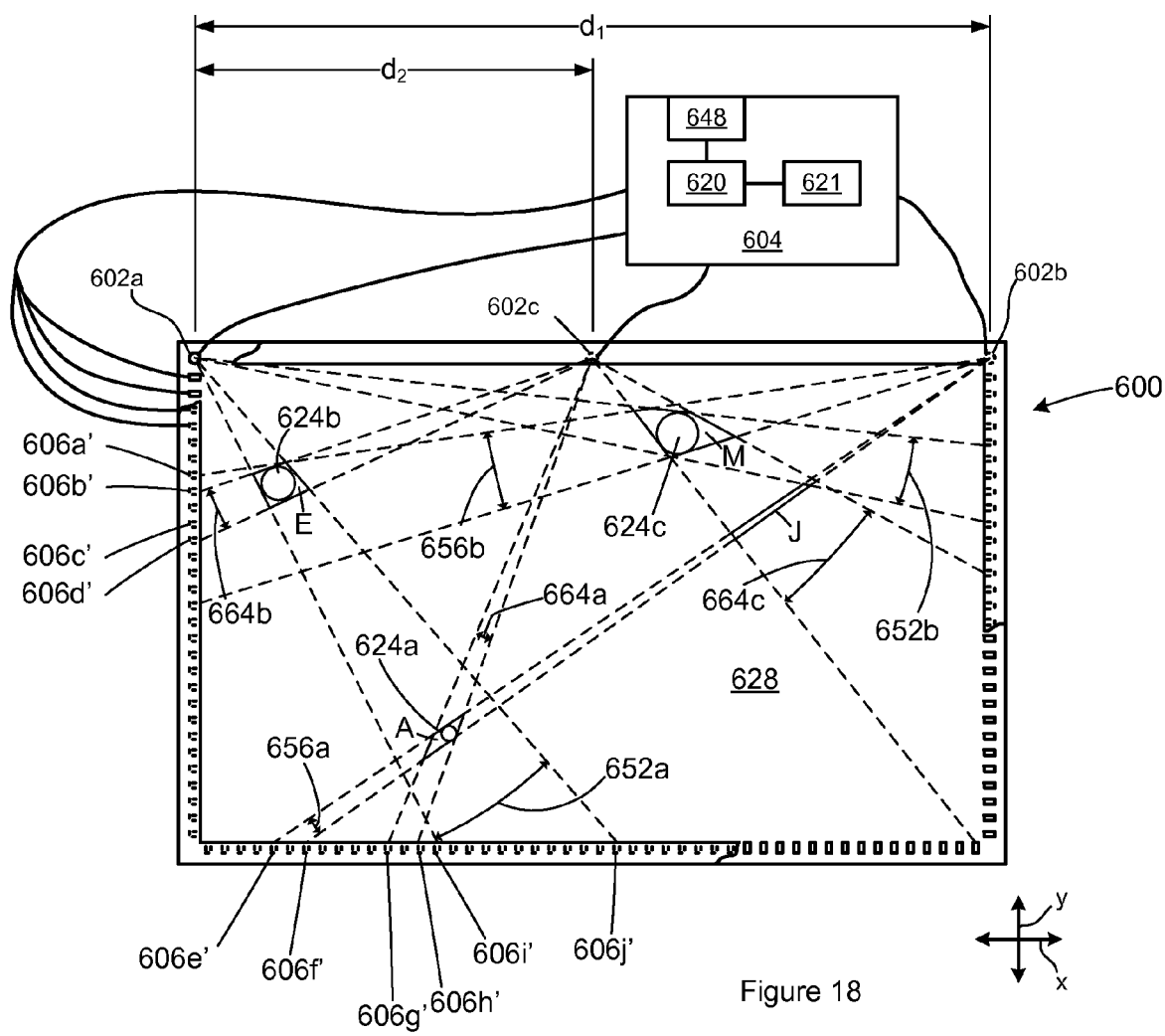
FIG. 18 illustrates another arrangement of radiation blocking objects on the system of FIG. 6.

Reference is made to FIG. 18, which illustrates another method of selecting a combination of sectors. FIG. 18 illustrates system 600 with three radiation blocking object 624a, 624b and 624c positioned on display surface 628. Due to the locations of the radiation blocking objects in relation to the radiation sensors, the following sectors are identified: 652a, 652b, 656a, 656a, 664a, 664b and 664c. Controller 604 is configured to determine the minimum number of radiation blocking objects required given the number and position of the identified sectors. Controller 604 is configured to then select that number of combinations of sectors that results in the largest total angular span of all of the sectors being included in the selected combination.

In the arrangement shown in FIG. 18, at least three radiation blocking objects must be present given that sectors 652a, 652b, 656a, 656a, 664a, 664b and 664c are identified by the controller (based on the corresponding radiation intensity signals). Having determined that at least three radiation blocking objects are present on display surface 628, controller 604 is configured to then identify three combinations of sectors from the following combination:

| Combination | Radiation sensor 602a | Radiation sensor 602b | Radiation sensor 602c |
|---|---|---|---|
| A | Sector 652a | Sector 656a | Sector 664a |
| B | Sector 652a | Sector 656a | Sector 664b |
| C | Sector 652a | Sector 656a | Sector 664c |
| D | Sector 652a | Sector 656b | Sector 664a |
| E | Sector 652a | Sector 656b | Sector 664b |
| F | Sector 652a | Sector 656b | Sector 664c |
| G | Sector 652b | Sector 656a | Sector 664a |
| H | Sector 652b | Sector 656a | Sector 664b |
| J | Sector 652b | Sector 656a | Sector 664c |
| K | Sector 652b | Sector 656b | Sector 664a |
| L | Sector 652b | Sector 656b | Sector 664b |
| M | Sector 652b | Sector 656b | Sector 664c |

Controller 604 determines which combinations of sectors includes an overlapping polygon of three sectors in the combination, as described above in relation to step 706. Combinations that do not include an overlap of all sectors in the combination are discarded. In the arrangement of FIG.

18, only combinations A, E, J and M include a polygon corresponding to an overlap of all three sectors in the combination.

Of the combinations that do include an overlap, controller 604 selects three combinations such that each sector corresponding to each radiation source is used in at least of one of the selected combinations. In the arrangement of FIG. 18, the controller could select the following three combinations: A, E and J or A, E and M. The controller is configured to select the group of combinations whose corresponding polygons of the selected combinations cover the maximum angular span of all of the identified sectors 652a, 652b, 656a, 656a, 664a, 664b and 664c. The set of combinations A, E and M is preferred because the polygon of region M results in a greater angular span coverage of sector 656b.

In some embodiments, it may be desirable to estimate the size of a radiation blocking object. Reference is again made to FIG. 6. Radiation blocking object 624a has a smaller diameter than radiation blocking object radiation blocking object 624b. Various radiation blocking objects may have different shapes and dimensions, including irregular and variable shapes and dimensions. For example, a finger may be used as a radiation blocking object. Fingers have an irregular and variable shape. For example, a finger may be pressed gently or with greater force against a surface. Typically, as a finger is pressed harder against a surface, it will block a wider range of radiation sources from the view of a radiation source.

Figure 14:
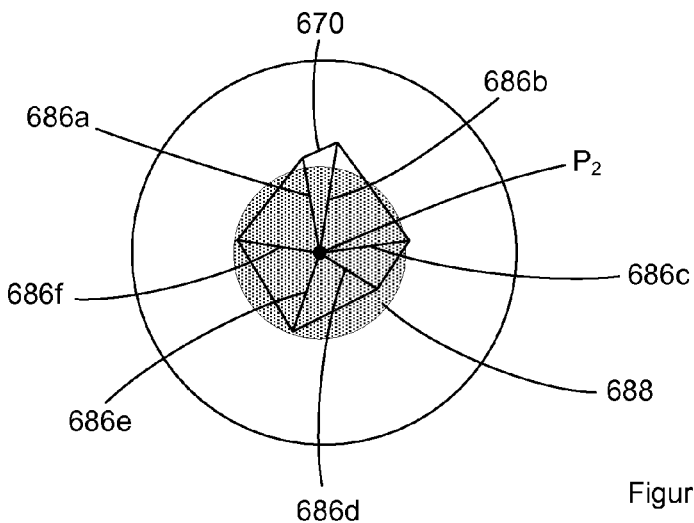
FIG. 14 illustrates a method of estimating the size of an radiation blocking object.

Reference is next made to FIG. 14, which illustrates polygon 670 described above in relation to FIG. 9c. As described above, controller 604 calculates an estimated position $P_2$ at the centroid of polygon 670. Lines 686a-686f extend from point $P_2$ to the vertices of polygon 670. Controller 604 may be configured to determine the average length of the lines 686. Circle 688 is centered at point $P_2$ and has a diameter equal to the average length of the lines 686. Circle 688 is an estimate of the dimension of the radiation blocking object corresponding to point $P_2$. In embodiments where the dimension of some or all of the radiation blocking objects is estimated, the touch table includes a dimension field for each slot. The estimated diameter for each estimated position is calculated and reported at the interface together with the estimated position as part of method 700.

Figure 15:
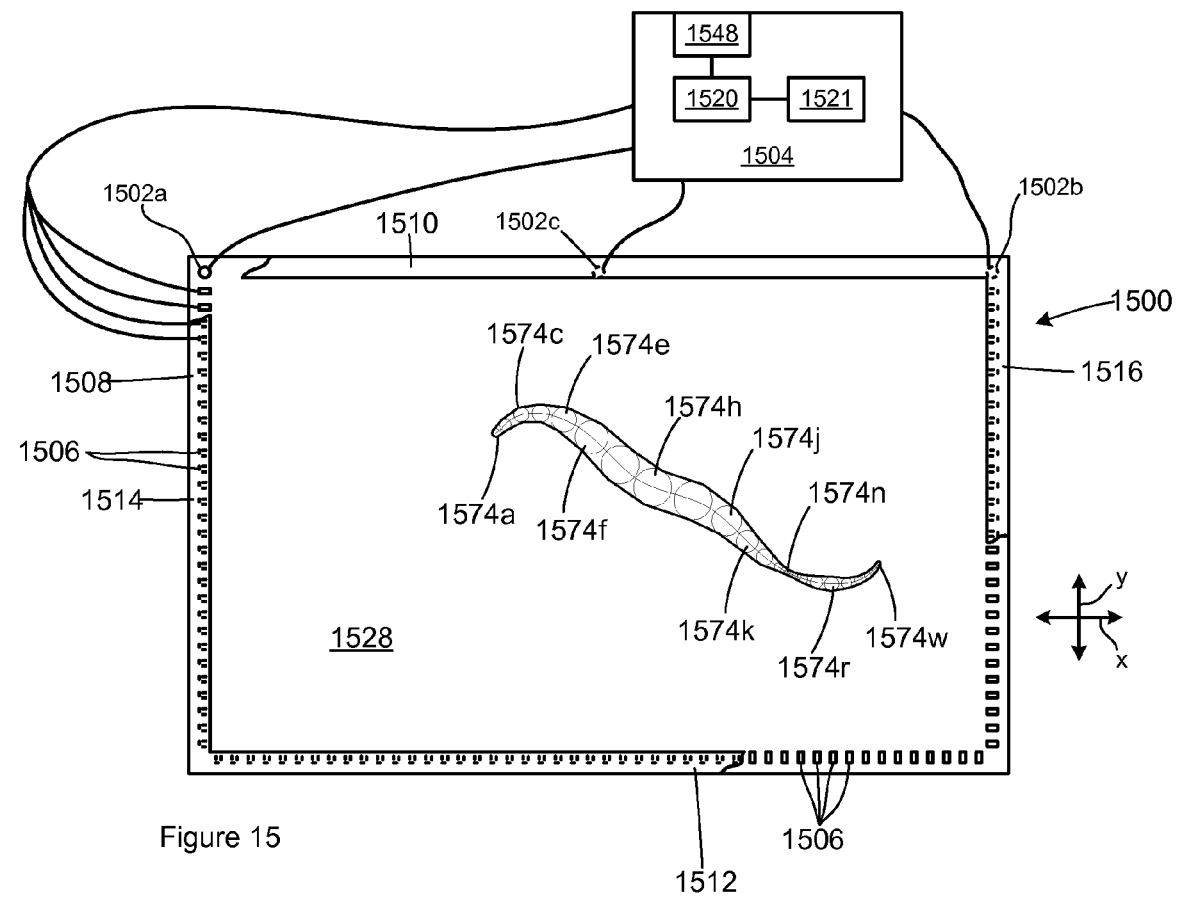
FIG. 15 illustrates a method of tracking a varying size of an radiation blocking object as it is moved.

Reference is next made to FIG. 15, which illustrates system 1500 that is similar to system 600. Corresponding components are identified with corresponding reference numerals. System 1500 is configured to provide an estimated dimension for each radiation blocking object together with the estimated position of the radiation blocking object. The radiation blocking object may be a finger or radiation blocking object with a variable dimension. In some embodiments, the display surface may be a display screen and a computing device coupled to interface 1548 may display successive circles corresponding to successive reported positions and dimensions of the radiation blocking object. A series of circles 1574a-1574w corresponding to a series of reported estimated center positions and estimated diameters for an radiation blocking object as it is moved across a display surface 1528 approximately along line 690. In the example of FIG. 15, the successive circles are shown spaced apart for clarity. In a practical embodiment, many more positions and dimensions will typically be reported as a radiation blocking object is moved such that successive circles would be substantially overlapping. Lines 692a and 692b illustrate the outside edges of a series of circles that could be displayed in such an embodiment. As the dimension of the radiation blocking object changes, and as it moves, its estimated size changes, allowing a user to draw a shape with a wider or narrower size.

Figure 16:
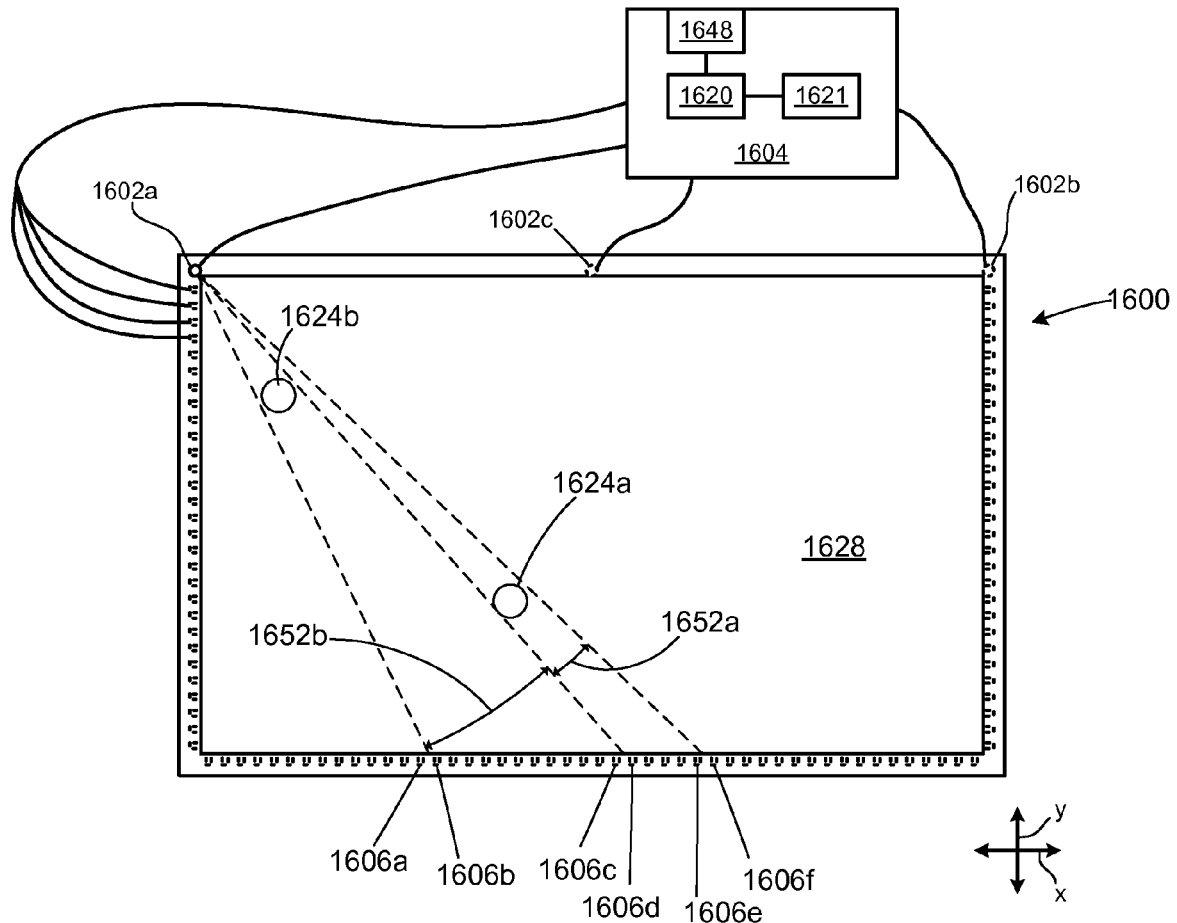
FIG. 16 illustrates another embodiment.
Figure 17:
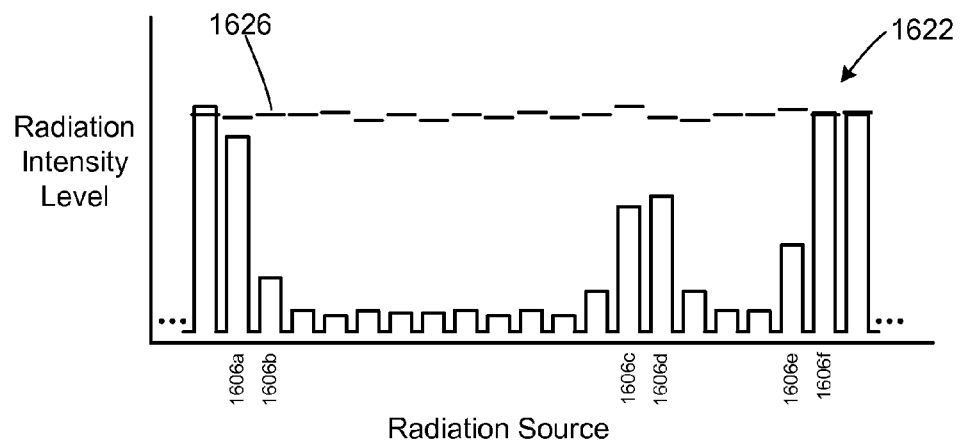
FIG. 17 illustrates a radiation intensity signal of the system of FIG. 16.

Reference is next made to FIGS. 16 and 17. FIG. 16 illustrates another system 1600 for estimating and tracking the positions of one or more radiation blocking objects 1624 on a surface 1628. System 1600 is similar in structure to the systems described above and corresponding components are identified by similar reference numerals.

Two radiation blocking objects 1624a and 1624b are positioned on surface 1628 such that they each attenuate radiation from different, but adjacent, ranges of radiation from reaching radiation sensor 1602a. FIG. 17 illustrates a radiation intensity signal 1622 corresponding to the arrangement of radiation blocking objects 1624a and 1624b in FIG. 16. The radiation intensity levels for radiation sources 1624b-1624e are all less than a selected proportion of their corresponding baseline intensity levels. In system 1600, the selected threshold is 80% of the baseline intensity level, although in other embodiments, different thresholds may be used to identify a radiation source that is attenuated due to the presence of a radiation blocking object. In the systems described above, radiation sources 1624b-1624e would be considered a single range of attenuated radiation sources and a single sector would be used to estimate the positions of radiation blocking objects 1624a and 1624b (in combination with sectors identified based on radiation intensity signals obtained from radiation sensors 1624b and 1624c).

In system 1600, controller 1604 is configured to identify one or more radiation sources that are attenuated less than their surrounding radiation sources by a selected amount or ratio. For example, if, in a particular system, a radiation source is typically attenuated to about 5% of its normal radiation intensity level when it is blocked from the view of a radiation sensor by a radiation blocking object, then the margin may be selected as 25%. If within a range of attenuated radiation sources, the attenuation of one or more radiation sources is at least 25% less than the neighboring radiation sources, then the one or more radiation sources are deemed to define the edges of different ranges of attenuated radiation sources. The centerpoint of the range of one or more radiation sources may be considered to be an edge of each of the different ranges of attenuated radiation sources.

In the example of FIGS. 16 and 17, controller 1604 identified radiation sources 1606c and 1606d as being at least 25% less attenuated than their neighboring radiation sources. Controller 1604 determines that the intermediate point between radiation sources 1606c and 1606d is the edge of two different ranges of attenuated radiation sources. In this way, controller is able to identify two different sectors 1652a and 1652b which may be used to estimate the position of radiation sources 1624a and 1624b.

System 1600 also illustrates another optional feature that may be used to refine the estimated positions of the edges of sectors used to estimate the position of radiation blocking objects.

In the systems described above, the edges of each sector are assumed to be aligned with the center of the first and last attenuated radiation sources corresponding to the sector.

In system 1600, the relative attenuation of radiation at and adjacent to the edges of a range of attenuated radiation sources is used to refine the position of the edges of a sector.

In radiation intensity signal 1622, the radiation intensity level for radiation source 1606a is attenuated to 85% (i.e. it is attenuated by 15%) of its corresponding baseline intensity level. The radiation intensity level for radiation source 1606b is attenuated to 28% (i.e. it is attenuated by 72%) of its baseline intensity level. In this embodiment, the attenuation of the two radiation sources is averaged:

$$\frac{15\% + 72\%}{2} = 43.5\%$$

The edge of sector 1652b is estimated to be at 43.5% of the distance between the centers of radiation sources 1606b and 1606a.

Similarly, radiation source 1606e is attenuated by 55% compared to its baseline intensity level while radiation source 1606f is not attenuated compared to its baseline intensity level. The edge of sector 1652a is estimated to be at 27.5% of the distance between the centers of radiation sources 1606e and 1606f.

This technique may be used to refine both edges of a sector based on the relative attenuation of radiation sources at the edge of a range of attenuated radiation sources and the adjacent radiation source outside the range.

In other embodiments, the edge of a sector may be determined by calculating a weighted average of the angular positions of a radiation source at the edge of range of radiation sources and the adjacent source outside the range, based on the relative attenuation of the radiation sources.

In other embodiments, the relative attenuation of two radiation sources at the edge of a range of attenuated radiation sources may be used to estimate the edge of a sector.

Various embodiments have been described here by way of example only. Various modification and variations may be made to these exemplary embodiments without departing from the spirit and scope of the invention.

We claim:

1. A method of estimating the position of multiple radiation blocking object on a surface, the method comprising:
    providing at least three radiation sensors including a first radiation sensor, a second radiation sensor and a third radiation sensor;
    providing a plurality of radiation sources, wherein:
        radiation emitted by at least some of the radiation sources passes across the surface and is incident on each of the sensors;
    assembling a radiation intensity signal corresponding to each of the radiation sensors, including a first radiation intensity signal corresponding to the first radiation sensor, a second radiation intensity signal corresponding to the second radiation sensor and a third radiation intensity signal corresponding to the third radiation sensor;
    estimating the number of radiation blocking objects present on the surface based on one or more of the radiation intensity signals;
    identifying one or more sectors corresponding to each of the radiation sensors based on the radiation intensity signals;
    identifying one or more combinations of the sectors;
    analyzing at least some of the combinations to assess overlap between the sectors in each combination;
    selecting a number of combinations corresponding to the estimated number of radiation blocking objects based on the analysis; and
    estimating the position of the radiation blocking object based on the selected combinations.

2. The method of claim 1 wherein selecting one or more combinations includes:
    identifying a polygon corresponding to one or more of the combinations; and
    selecting combinations corresponding to polygons having the greatest area.

3. The method of claim 1 wherein selecting one or more combinations includes:
    identifying a polygon corresponding to one or more of the combinations; and
    selecting combinations corresponding to polygons that result in a greater angular span of the sectors.

4. The method of claim 1 wherein selecting one or more combinations includes:
    identifying a polygon corresponding to one or more of the combinations; and
    selecting combinations corresponding to polygons that result in a maximum angular span of the sectors.

5. The method of claim 1 wherein selecting one or more combinations includes selecting at least combination corresponding to each sector.

6. The method of claim 1 further including recording the estimated position of the one or more radiation blocking objects in a touch table.

7. The method of claim 1 wherein estimating the position of at least one radiation blocking object includes:
    identifying a polygon corresponding to one of the selected combinations; and
    estimating the position of the radiation blocking object based on the polygon.

8. The method of claim 7 wherein estimating the position of the radiation blocking object based on the polygon includes identifying a point relative to the polygon.

9. The method of claim 8 wherein the identified point is at the center of a circle inscribed within the polygon.

10. The method of claim 8 wherein the identified point is at the center of a circle that circumscribes the polygon.

11. The method of claim 8 wherein the identified point is the point at which the sum of the shortest distance from the point to the sides of the polygon is minimized.

12. The method of claim 1 further including adjusting at least one of the radiation intensity signals to account for ambient radiation.

13. The method of claim 12 wherein adjusting a radiation intensity signal for ambient radiation includes obtaining an ambient radiation intensity level for the corresponding radiation sensor and adjusting the radiation intensity signal based on the ambient radiation intensity level.

14. The method of claim 1 wherein each radiation intensity signal corresponding to a radiation sensor is assembled by sequentially sampling a radiation intensity level from the radiation sensor while at least some of the radiation sources are sequentially activated.

15. The method of claim 1 wherein the radiation intensity signals are assembled contemporaneously.

16. The method of claim 1 wherein at least one of the radiation sources is activated separately at different intensities to generate a radiation intensity signal corresponding to a first radiation sensor and a radiation intensity signal corresponding to the second radiation sensor.

17. The method of claim 1 wherein the radiation intensity signals are assembled sequentially.

18. The method of claim 1 wherein the edges of a plurality of sectors are determined based on variations of radiation intensity levels in a radiation intensity signal.

19. The method of claim 18 wherein the edges of a plurality of sectors are determined be identifying a range of radiation sources that is attenuated less than the radiation sources on either side of the range by a selected threshold.

* * * * *